(12) United States Patent
Petrick

(10) Patent No.: US 9,743,386 B2
(45) Date of Patent: Aug. 22, 2017

(54) MAPPED DEVICE/PHY MAINTAINING SYSTEM

(71) Applicant: Dell Products L.P., Round Rock, TX (US)

(72) Inventor: Christopher Stephen Petrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 14/943,910

(22) Filed: Nov. 17, 2015

(65) Prior Publication Data

US 2017/0142689 A1    May 18, 2017

(51) Int. Cl.
*H04W 72/04*    (2009.01)
*H04B 1/40*    (2015.01)

(52) U.S. Cl.
CPC .............. *H04W 72/04* (2013.01); *H04B 1/40* (2013.01)

(58) Field of Classification Search
CPC ................................ H04W 72/04; H04B 1/40
See application file for complete search history.

(56) References Cited

U.S. PATENT DOCUMENTS

| 8,078,108 | B2 | 12/2011 | Wissendheit et al. |
| 8,213,344 | B2 | 7/2012 | Zhu et al. |
| 2007/0064830 | A1 | 3/2007 | Choi et al. |
| 2008/0008134 | A1* | 1/2008 | Satou ..................... H04B 7/063 370/334 |
| 2010/0120466 | A1 | 5/2010 | Li |
| 2013/0275568 | A1* | 10/2013 | Nguyen .............. H04L 41/0806 709/223 |

OTHER PUBLICATIONS

Dave Bursky, "RF Switches Simplify Multi-Antenna Systems," Aug. 23, 2012, pp. 1-4, Difi-Key Electronics, http://digikey.com/en/articles/techzone/2012/aug/rf-switches-simplify-multi-antenna-systems.

* cited by examiner

*Primary Examiner* — Duc C Ho
(74) *Attorney, Agent, or Firm* — Haynes and Boone, LLP

(57) ABSTRACT

A device/PHY mapping maintaining system includes a rack that houses a networking device and that is configured to house a server device in different locations. The networking device provides a device/PHY mapping between the server device and a first PHY when the server device communicates with a first antenna system that is connected to the first PHY through a first radio processing engine. The networking device determines that the server device is communicating with a second antenna system that is connected to a second PHY through a second radio processing engine and, in response, connects the second antenna system to the first PHY to maintain the device/PHY mapping between the server device and the first PHY by connecting at least one of the second antenna system and the first PHY to a different radio processing engine.

20 Claims, 16 Drawing Sheets

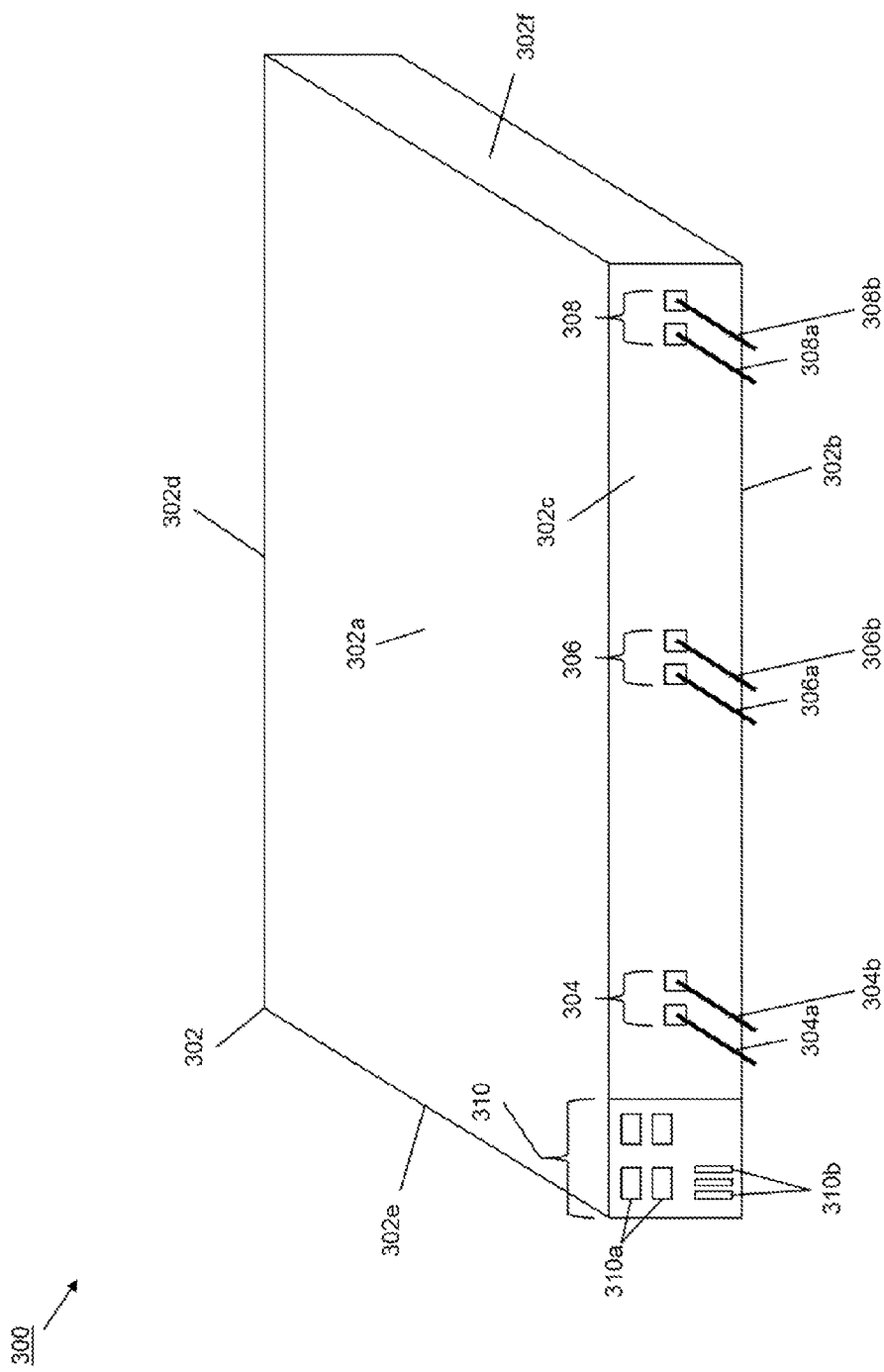

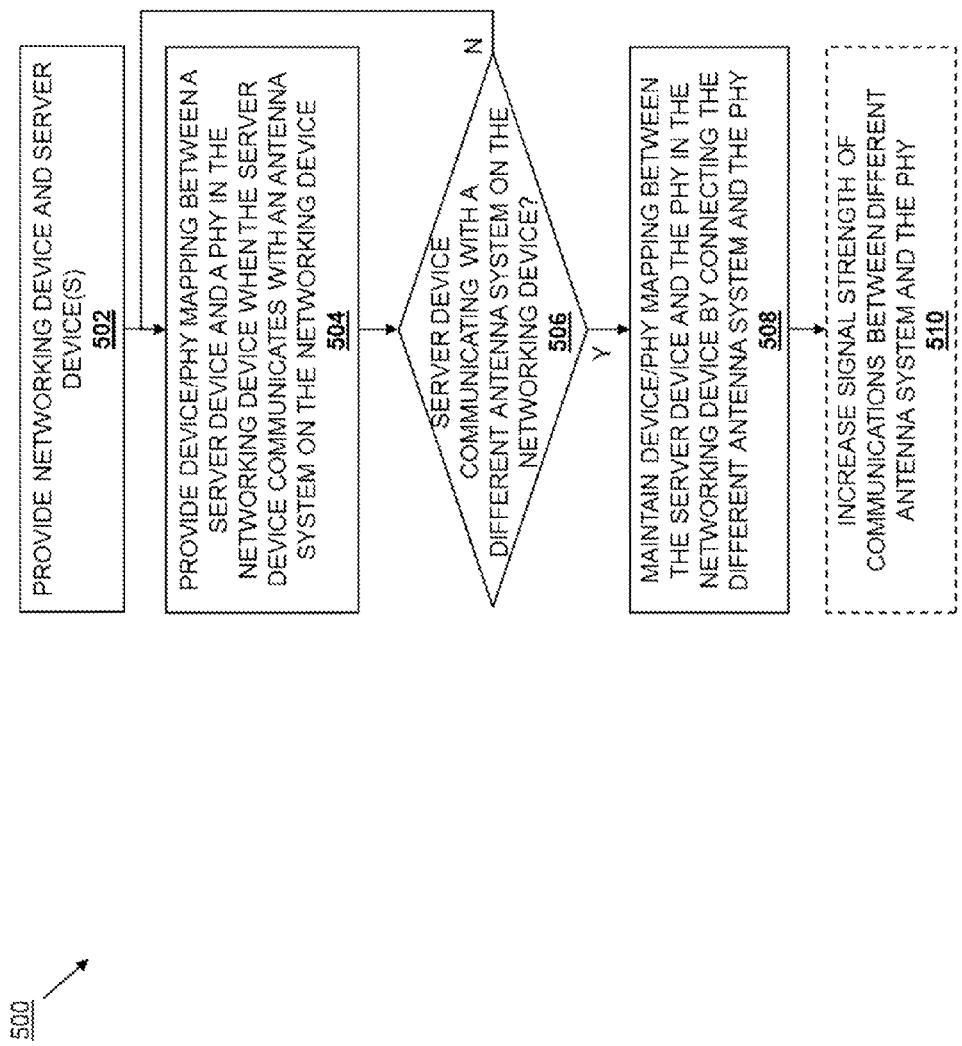

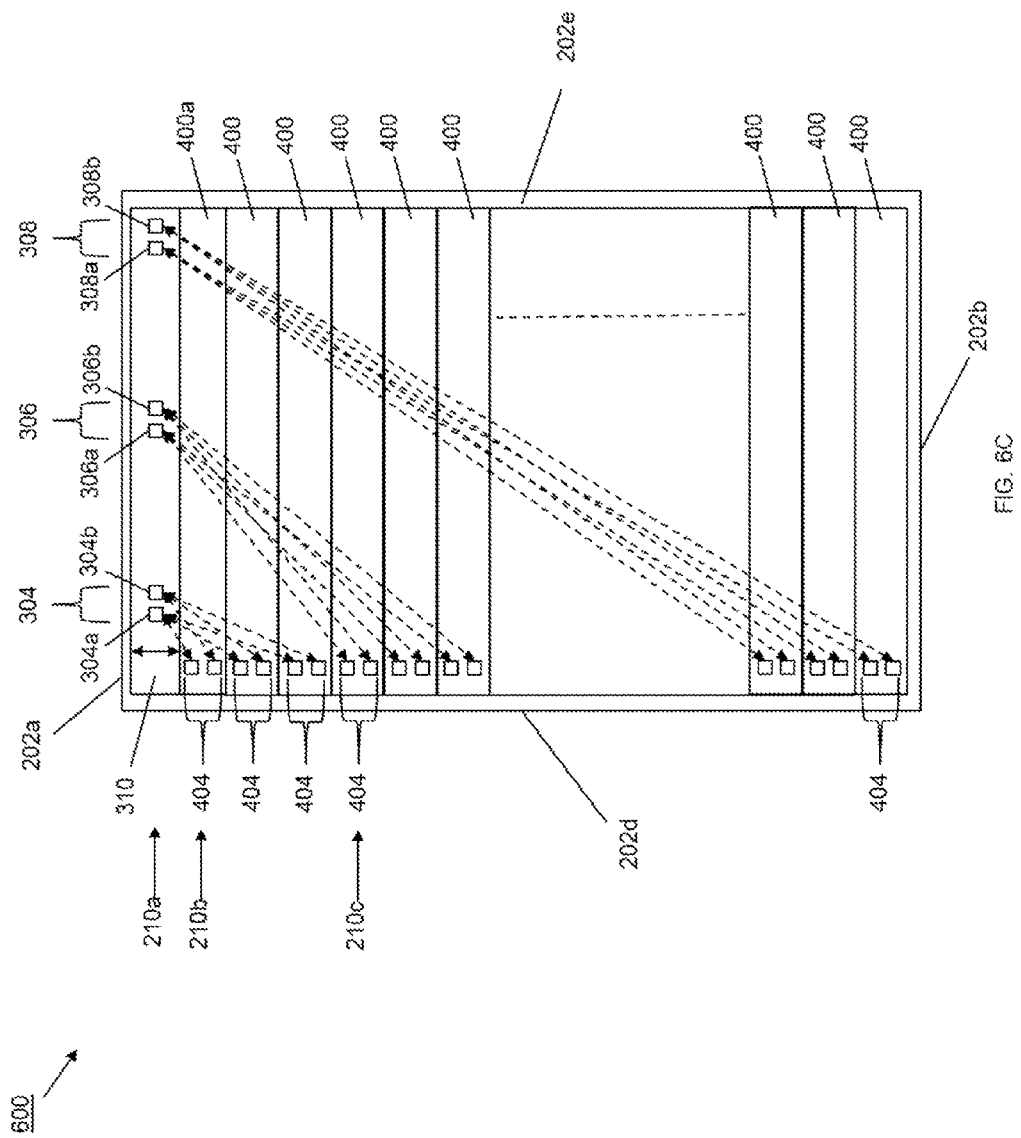

MAPPED DEVICE/PHY MAINTAINING SYSTEM

BACKGROUND

The present disclosure relates generally to information handling systems, and more particularly to a system for maintaining mappings between information handling systems that are wirelessly coupled to PHYs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switches, servers, and storage devices, are sometimes positioned in racks and connected together in order to provide a datacenter. For example, a plurality of servers may be connected to a Top Of Rack (TOR) switch that is connected to a network, and the TOR switch may route data from the network and to the servers, from the servers and to the network, as well as between different components in the rack. The servers and TOR switches are typically connected together using conventional cabling such as, for example, Ethernet cables that are configured to transmit the data between the TOR switch and the servers. However, because racks can hold dozens of servers, the connection of between those servers and the TOR switch requires many cables that must be routed through the rack, and that cabling can become cumbersome, obstructing access to the TOR switch, servers, and/or other features of the rack. It is desirable to eliminate the use of conventional cables in connecting devices in a rack, but the use of wireless communication raises a number of issues.

For example, any particular server may be "mapped" to a first PHY chip that is provided with a first port on the Ethernet switch chip in the TOR switch due to the first PHY chip having been configured for that server to provide a Virtual Local Area Network (VLAN), an Access Control List (ACL), and/or a variety of other server/PHY configurations known in the art. As such, it is desirable for the mapping to be maintained (i.e., for that server to continue to communicate through the TOR switch via the first PHY chip.) However, when the server connects to the first PHY chip wirelessly using a first antenna on the TOR switch that is coupled to the first PHY chip via a first radio Application Specific Integrated Circuit (ASIC), the physical relocation of that server may result in the server wirelessly connecting to a second antenna on the TOR switch that is coupled to a second radio ASIC that may connect the server to a second PHY chip provided with a second port on the Ethernet switch chip that has not been configured for that server. The movement of the server such that it connects to the second PHY chip requires a network administrator to go to the physical location of the TOR switch and reconfigure the system. As such, while the wireless connection of servers to the TOR switch should increase the ease with which those servers may be physically relocated, issues such as those discussed above impede such physical relocation due to the need for an administrator to perform manual reconfigurations to maintain proper operation of the system.

Accordingly, it would be desirable to provide an improved system for maintaining device/PHY mappings.

SUMMARY

According to one embodiment, an Information Handling System (IHS), includes a database storing a device/PHY mapping; a networking processing system including a plurality of PHYs; a plurality of radio processing engines; a PHY/radio switch matrix coupling the plurality of PHYs to the plurality of radio processing engines; a plurality of antenna systems; an antenna/radio switch matrix coupling the plurality of antenna systems to the plurality of radio processing engines; and a central processing engine that is coupled to the database, the PHY/radio switch matrix, and the antenna/radio switch matrix, wherein the central processing engine is configured to: provide the device/PHY mapping between a device and a first PHY of the plurality of PHYs when the device communicates with a first antenna system of the plurality of antenna systems that is connected to the first PHY through connections provided by the PHY/radio switch matrix and the antenna/radio switch matrix to a first radio processing engine of the plurality of radio processing engines; determine that the device is communicating with a second antenna system of the plurality of antenna systems that is connected to a second PHY of the plurality of PHYs through connections provided by the PHY/radio switch matrix and the antenna/radio switch matrix to a second radio processing engine of the plurality of radio processing engines; and connect the second antenna system to the first PHY to maintain the device/PHY mapping between the device and the first PHY, wherein the connecting of the second antenna system to the first PHY includes connecting at least one of the second antenna system and the first PHY to a different radio processing engine of the plurality of radio processing engines using at least one of the PHY/radio switch matrix and the antenna/radio switch matrix.

BRIEF DESCRIPTION OF THE DRAWINGS

FIG. 3A is a perspective view illustrating an embodiment of a networking device.

FIG. 5 is a flow chart illustrating an embodiment of a method for maintaining device/PHY mappings.

FIG. 6C is a front view illustrating an embodiment of communications between the networking device and the server devices in the rack of FIG. 6B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
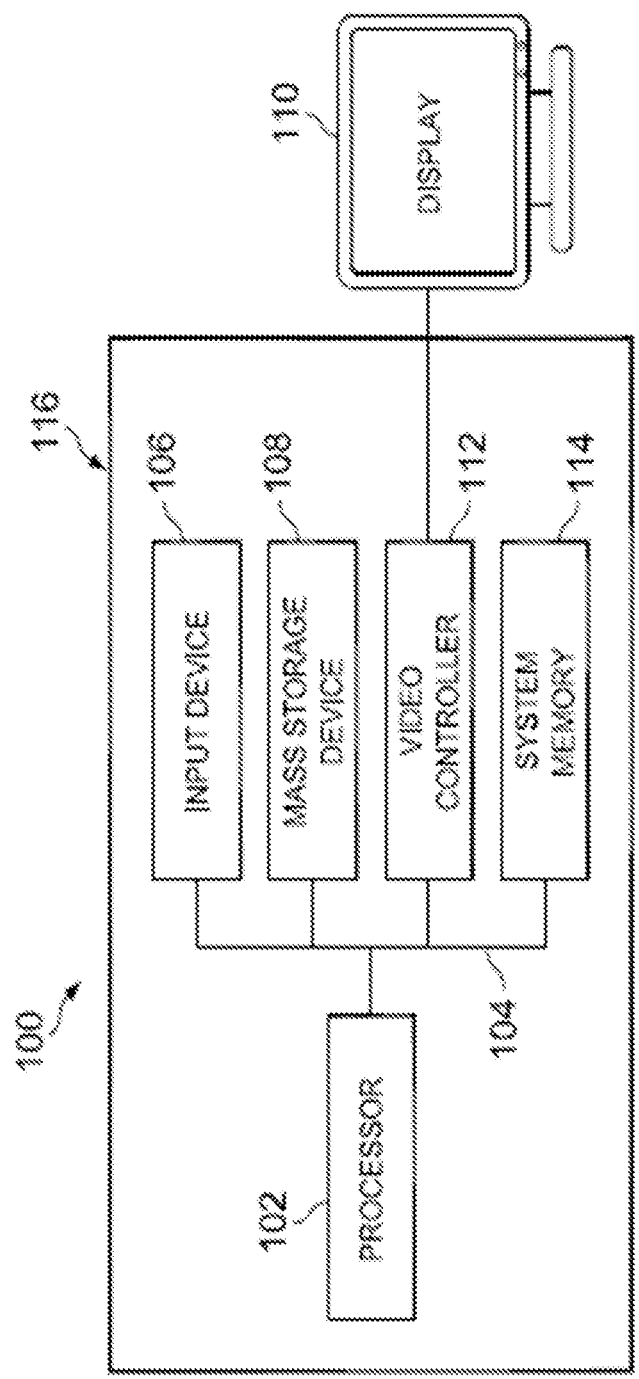
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
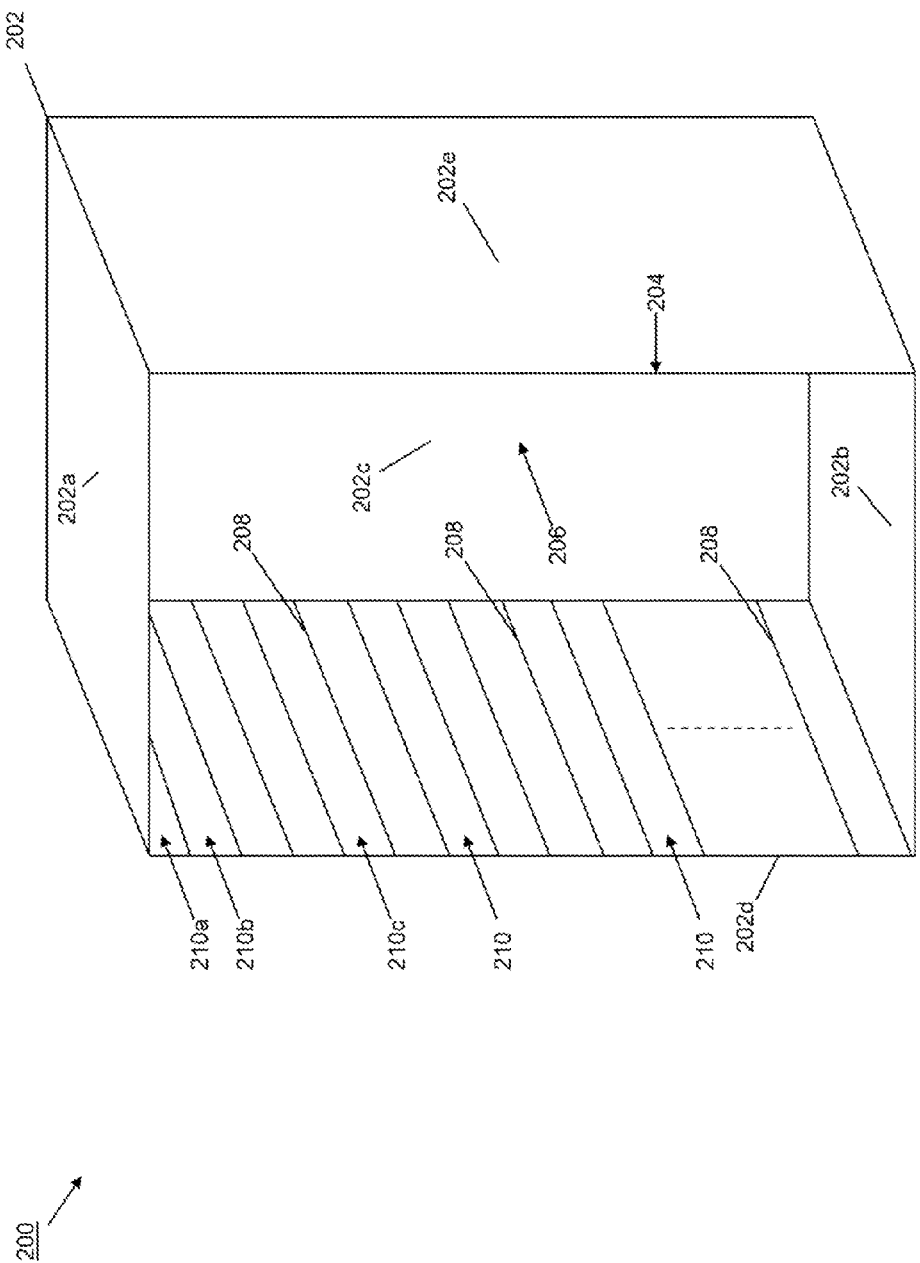
FIG. 2 is a perspective view illustrating an embodiment of a rack.

Referring now to FIG. 2, an embodiment of a rack 200 is illustrated. The rack 200 is illustrated and described below as a conventional datacenter rack that houses a plurality of server devices and a networking device (e.g., a TOR switch) in a vertical (e.g., one-on-top-of-the-other) orientation. However, one of skill in the art in possession of the present disclosure will recognize that the teachings of the present disclosure may be applied to different types of racks used in different situations (e.g., other than datacenters) and that house other types of devices (e.g., storage devices) in any of a variety of orientations (e.g., a horizontal/side-by-side orientation). The rack 200 includes a rack base 202 having a top wall 202a, a bottom wall 202b that is located opposite the rack base 202 from the top wall 202a, a rear wall 202c that extends between the top wall 202a and the bottom wall 202b, and a pair of side walls 202d and 202e that are located on opposite sides of the rack base 202 and that extend between the top wall 202a, the bottom wall 202b, and the rear wall 202c. While illustrated and described as "walls" for clarity, one of skill in the art in possession of the present disclosure will recognize that any or all of the top wall 202a, the bottom wall 202b, the rear wall 202c, and the side walls 202d and 202e may instead include framing, define channels, holes, or other apertures, and/or may otherwise include different structures that provide the rack 200 while remaining within the scope of the present disclosure. The edges of the top wall 202a, the bottom wall 202b, and the side walls 202d and 202e that are opposite the rear wall 202c define a rack entrance 204 that provides access to a rack housing 206 that is defined between the top wall 202a, the bottom wall 202b, the rear wall 202c, and the side walls 202d and 202e. In the embodiment of FIG. 2, the rack entrance 204 is illustrated as open and allowing access to the rack housing 206. However, in other embodiments, the rack 200 may include a door that is configured to close over the rack entrance 204 and control access to the rack housing 206 (e.g., in a cooled rack). As such, in some embodiments the rack entrance 204 may provide a design limit with regard to devices positioned in the rack housing 206 (e.g., such that they may not extend past the rack housing 204), while in other embodiments, the rack entrance 204 may not introduce such design limits (or at least allow for the extension of devices past the rack housing 204).

As illustrated, the side wall 202d may include a plurality of device coupling features 208 that define a plurality of device housings 210 including a first device housing 210a and second device housings (e.g., 210b and 210c). While not illustrated, the side wall 202e may include similar device coupling features that operate to define the device housing housings 210. In the embodiments discussed below, the first device housing 210a is described as being utilized in coupling a networking device to the rack 200, while the second device housings 210b and 210c (as well as others of the devices housings 210) are described as being utilized in coupling server devices to the rack 200. However, one of skill in the art in possession of the present disclosure will recognize that the first device housing 210a and the second device housings 210b and 210c may be substantially similar, and may be used to couple any of a variety of different devices to the rack 200. In specific embodiments discussed below, the rack 200 is described as a conventional 19-inch rack that is configured to house devices having widths of approximately 19 inches (e.g., as measured between the side walls 202d and 202e of the rack 200), and that includes a height of 42 rack units (42 U) such that the rack 200 may include a networking device in the first device housing 210a and forty server devices in the second device housings 210b, 210c, and the others of the device housings 210. However, the teachings of the present disclosure are not intended to be limited to this specific embodiment, and one of skill in the art will recognize that those teachings may be applied to "half-height" racks, horizontal racks, and/or other racks known in the art while remaining within the scope of the present disclosure.

Figure 3B:
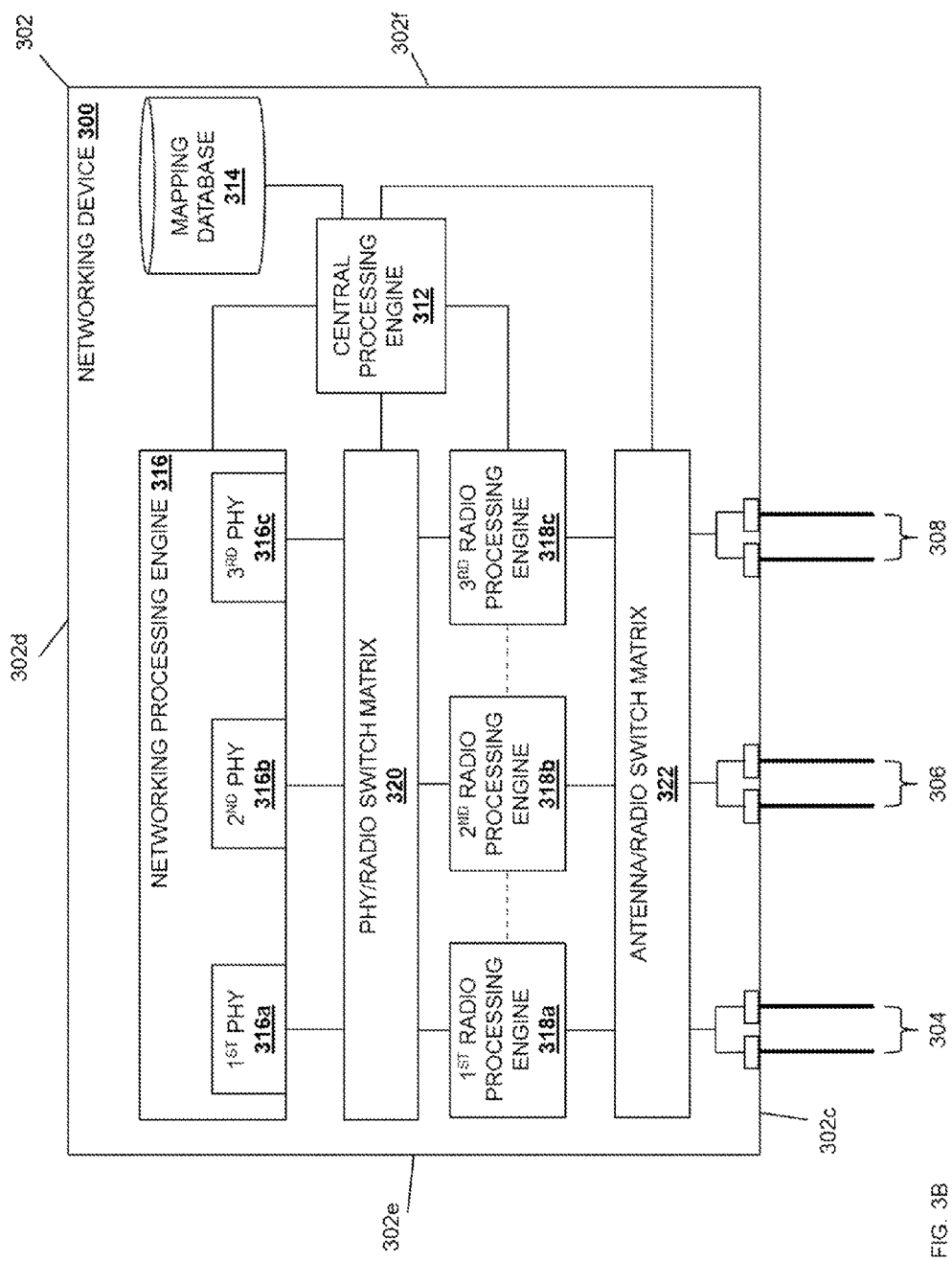
FIG. 3B is a schematic view illustrating an embodiment of the networking device of FIG. 3A.

Referring now to FIGS. 3A and 3B, an embodiment of a networking device 300 is illustrated. The networking device 300 may be the IHS 100 discussed above with reference to FIG. 1 and/or may include some or all of the components of the IHS 100. In a specific embodiment, the networking device 300 may be a Top Of Rack (TOR) switch. However, in other embodiments, the networking device 300 may be other types of switches (e.g., a Fibre Channel switch for a Storage Area Network (SAN)) and/or other types of rack devices while remaining within the scope of the present disclosure. The networking device 300 includes a chassis 302 having a top surface 302a, a bottom surface 302b that is located opposite the chassis 302 from the top surface 302a, a front surface 302c extending between the top surface 302a and the bottom surface 302b, a rear surface 302d located opposite the chassis 302 from the front surface 302c and extending between the top surface 302a and the bottom surface 302b, and a pair of side surfaces 302e and 302f located opposite the chassis 302 from each other and extending between the top surface 302a, the bottom surface 302b, the front surface 302c, and the rear surface 302d. While not illustrated, each of the side surfaces 302e and 302f (as well as other surfaces) on the networking device 300 may include rack engagement features for engaging the device coupling features 208 on the rack 200 to couple the networking device 300 to the rack 200.

In the embodiments discussed below, the front surface 302c of the networking device 300 includes three antenna systems 304, 306, and 308 that extend from the front surface 302c. However, different numbers of antenna systems (e.g., two antenna systems, more than three antenna systems) may be provided with the networking device 300 that operate in the manner discussed below for the antenna systems 304, 306 and 308 while remaining within the scope of the present disclosure. The antenna systems 304, 306, and 308 may include smart antenna systems, multiple-input and multiple-output (MIMO) antenna systems, phased array antenna systems, and/or a variety of other antenna systems known in the art. In the illustrated embodiment, the antenna system 304 includes a pair of antennas (e.g., antennas 304a and 304b), the antenna system 306 includes a pair of antennas (e.g., antennas 306a and 306b), and the antenna system 308 includes a pair of antennas (e.g., antennas 308a and 308b). However, different numbers of antennas (e.g., a single antenna, more than two antennas, etc.) will fall within the scope of the present disclosure. In a specific embodiment, the antennas in the antenna systems 304, 306, and 308 may be provided by 802.11ad transmitters and/or receivers (e.g., the antenna 304a in the antenna system 304 may be provided as a transmitter, while the antenna 304b in the antenna system 304 may be provided as a receiver). However, other wireless standards used for internetworking devices may be utilized in the networking device such as, for example, 802.11n, 802.11ac, 802.11ay, Wideband Code Division Multiple Access, 3GPP Long Term Evolution (LTE), etc. While each of the antennas in the antenna systems 304, 306, and 308 are illustrated with straight lines, one of skill in the art in possession of the present disclosure will recognize that antenna(s) used in antenna systems may include a three-dimensional shape/configuration that provides a width and height (as well as the length that is illustrated). For example, the antennas 304a and 304b used for the antenna system 304 may include a width of approximately 5 millimeters and a height of approximately 1-2 millimeters.

In the embodiments discussed below, the antennas in the antenna systems 304, 306, and 308 are an integrated component of the networking device 300 such that they are not configured to be removed from the front surface 302c of the chassis 302. However, in some embodiments, the antennas for the antenna systems 304, 306, and 308 may be configured to be coupled to and decoupled from the networking device 300. For example, the antennas for the antenna systems 304, 306, and 308 may be configured to couple to Ethernet ports, Fibre Channel ports, Serial Attached Small Computer System Interface (SCSI) (SAS) ports, Infiniband ports, Universal Serial Bus (USB) ports, Peripheral Component Interconnect express (PCIe) ports, and/or other ports on the networking device 300 while remaining within the scope of the present disclosure. In some of those examples, the antennas for the antenna systems 304, 306, and 308 may couple to conventional Ethernet ports on a structurally conventional networking device (that includes the functionality taught by the present disclosure) if the configuration of those Ethernet ports is sufficient to provide the wireless communication functionality discussed below. However, in other examples, the networking device 300 may be configured with Ethernet ports according to the teachings below in order to provide the wireless communication functionality discussed below. Thus, one of skill in the art in possession of the present disclosure will recognize that the provisioning of antennas on the networking device 300 to provide the wireless communication functionality discussed below will depend on the configuration of the system (i.e., the rack, the devices in the rack, etc.), and a wide variety of different antenna systems (integrated, port-coupled, combinations thereof, etc.) will fall within the scope of the present disclosure.

The networking device 300 may also include a variety of other networking device features, only some of which are illustrated in FIGS. 3A and 3B. For example, a management port area 310 may be provided on the front surface 302c. In the illustrated embodiment, the management port area 310 includes a plurality of management Ethernet ports 310a and a plurality of management Universal Serial Bus (USB) ports 310b, but one of skill in the art in possession of the present disclosure will recognize that a variety of other management ports and/or management features may be provided in the management port area 310 (e.g., including but not limited to 802.11 functionality, Bluetooth functionality, Near Field Communications functionality) while remaining within the scope of the present disclosure. Furthermore, the management port area 310 is provided at a location on the front surface 302c of the networking device 300 that is adjacent the side surface 302e based, at least on part, in the configuration of the rack 200 in order to allow for the wireless communication paths discussed below, and the location of the management port area 310 may be moved based on different rack configurations to provide different wireless communication paths as desired or required by the rack configuration.

While not illustrated, one of skill in the art in possession of the present disclosure will recognize that a plurality of networking ports (e.g., Ethernet ports, switch uplink ports, Fibre Channel ports, SAS ports, Peripheral Component Interconnect Express (PCIE) ports, Infiniband ports, USB ports, High Speed Serial ports, etc.) may be provided on the front surface 302c of the networking device 300 between the antenna systems 304, 306, and 308 and the top surface 302a. Similarly as with the management port area 310, the networking ports may be provided on the front surface 302c of the networking device 300 based, at least on part, in the configuration of the rack 200 in order allow for the provision of the wireless communications discussed below, and the location of the networking ports may be moved based on different rack configurations to provide different wireless communication paths as desired or required by the rack configuration. In the specific embodiment illustrated in FIG. 3A, no ports or other obstructions are provided on the front surface 302c between the antenna systems 304, 306, and 308 and the bottom surface 302b of the chassis 302 in order to allow for the wireless communication paths discussed below. However, one of skill in the art in possession of the present disclosure will recognize how the networking device 300 may be modified to operate as discussed below when used with the rack in different configurations (e.g., by providing an unobstructed front surface 302c between the antenna systems 304, 306, and 308 and the top surface 302a when the networking device 300 is positioned in the bottom of the rack 200).

Referring now to FIG. 3B, the chassis 302 of the networking device 300 may house a central processing system (not illustrated, but which may be the processor 102 discussed above with reference to FIG. 1 and, in specific embodiments, any of a variety of central processing units (CPUs) known in the art) and a memory system (not illustrated, but which may be the system memory 114 discussed above with reference to FIG. 1) that includes instructions that, when executed by the processing system, cause the processing system to provide a central processing engine 312 that is configured to perform the functions of the central processing engines and networking devices discussed below. The chassis 302 may also house a storage device (not illustrated, but which may include the storage device 108 discussed above with reference to FIG. 1) that includes a mapping database 314 that is coupled to the central processing engine (e.g., via a coupling between the central processing system and the storage system). As discussed in further detail below, the mapping database 314 may store device/PHY mappings that associate connected devices with PHYs that have been configured for those connected devices, as well as any other information or details about the connection of those devices to the networking device 300.

The chassis 302 may also house a network processing system (not illustrated, but which may be the processor 102 discussed above with reference to FIG. 1 and, in specific embodiments, any of a variety of Ethernet switch Application Specific Integrated Circuits (ASICs) known in the art) that is configured to provide a network processing engine 316 that performs the functions of the network processing engines and networking devices discussed below. The networking processing engine 316 includes a first PHY chip ("PHY") 316a, a second PHY 316b, and up to a third PHY 316c. For example, the Ethernet switch ASIC that provides the network processing engine 316 may include a plurality of ports, each of which includes a PHY. While only three PHYs 316a-c are illustrated, one of skill in the art in possession of the present disclosure will recognize that any number of PHYs may be provided in the networking processing engine 316 while remaining within the scope of the present disclosure. In the illustrated embodiment, the networking processing engine 316 is coupled to the central processing engine 312 (e.g., via a coupling between the central processing system and the network processing system.)

The chassis 302 may also house a plurality of radio processing systems (not illustrated, but which may each be the processor 102 discussed above with reference to FIG. 1 and, in specific embodiments, 802.11 ASICs, beamforming ASICs, and/or other radio ASICs known in the art) that are configured to provide a first radio processing engine 318a, a second radio processing engine 318b, and a third radio processing engine 318c that perform the functions of the radio processing engines and networking devices discussed below. While only three radio processing engines 318a-c are illustrated, one of skill in the art in possession of the present disclosure will recognize that any number of radio processing engines may be provided in the networking device 300 while remaining within the scope of the present disclosure. In the illustrated embodiment, each of the radio processing engine 318a-c is coupled to the central processing engine 312 (e.g., via a coupling between the central processing system and the network processing system.) In the illustrated embodiment, the dotted lines between the first radio processing engine 318a and the second radio processing engine 318b, and between the second radio processing engine 318b and the third radio processing engine 318c, are intended to indicate separate connections of each of the radio processing engines 318a-c to the central processing engine 312, although other configurations and connections of the central processing engine 312 and the radio processing engines 318a-c are envisioned as falling within the scope of the present disclosure. The chassis 302 also houses a PHY/radio switch matrix 320 that is coupled to the central processing engine 312 and that, as discussed below, is configurable to provide connections between any of the PHYs 316a, 316b, and 316c and any of the radio processing engines 318a, 318b, and 318c. For example, the PHY/radio switch matrix 320 may include a crossbar matrix, a non-blocking/blocking switch, a trunk switch, a buffered/non-buffered switch, a multiway switch, a multistage circuit switch, an RF Switch Matrix, a communications based zero speed switch, a time driven switch, a minimal spanning switch, an automatic transfer switch, a crossover switch, and/or a variety of other switching matrixes known in the art. The chassis 302 also houses an antenna/radio switch matrix 322 that is coupled to the central processing engine 312 and that, as discussed below, is configurable to provide connections between any of the radio processing engines 318a, 318b, and 318c and any of the antenna systems 304, 306, and 308. For example, the antenna/radio switch matrix 322 may include a crossbar matrix, a crossbar matrix, a non-blocking/blocking switch, a trunk switch, a buffered/non-buffered switch, a multiway switch, a multistage circuit switch, an RF Switch Matrix, a communications based zero speed switch, a time driven switch, a minimal spanning switch, an automatic transfer switch, a crossover switch, and/or a variety of other switching matrixes known in the art. In some embodiments, each of the components illustrated in FIG. 3B may be provided mounted to a backplane in the networking device 300 such that those components provide an integrated device that is configured to perform the functions discussed below. However, in some embodiments, some or all of the components may be modular and configured to couple to a backplane in the networking device 300. For example, a backplane in the networking device 300 may include the central processing engine 312, the PHY/radio switch matrix 320, the antenna/radio switch matrix 322, and a plurality of connectors that are configured to couple to modular components that may include any or all of the network processing engine 316, the radio processing engines 318a-c, and/or the antenna systems 304, 306, and 308. One of skill in the art in possession of the present disclosure will recognize that any combination of the components illustrated in FIG. 3B may be integrated with a backplane or provided as modular components that may be coupled to the backplane to allow a user of the networking device 300 to change central processing engines, network processing engines, radio processing engines, and/or antenna systems as desired.

Figure 4A:
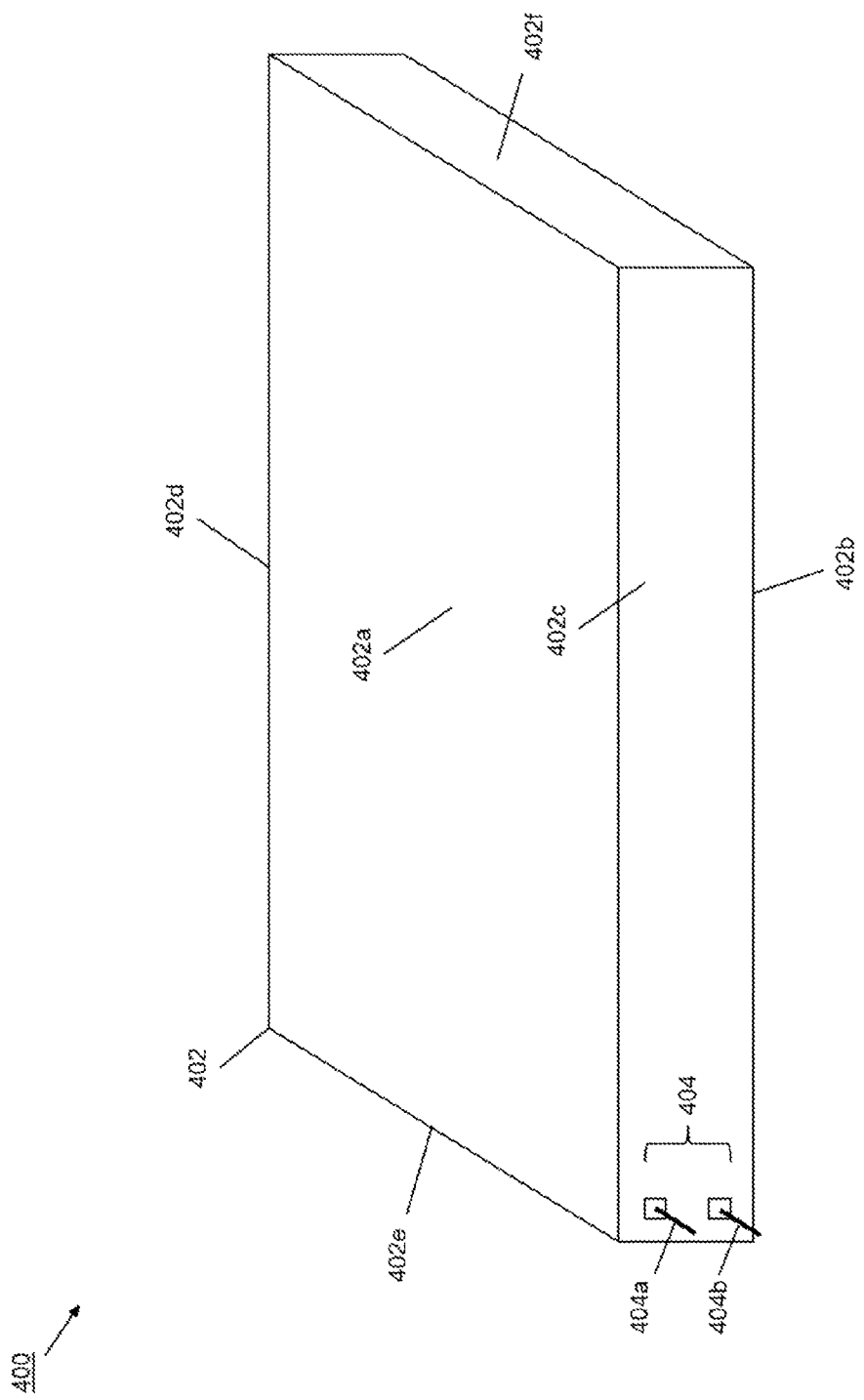
FIG. 4A is a perspective view illustrating an embodiment of a server device.
Figure 4B:
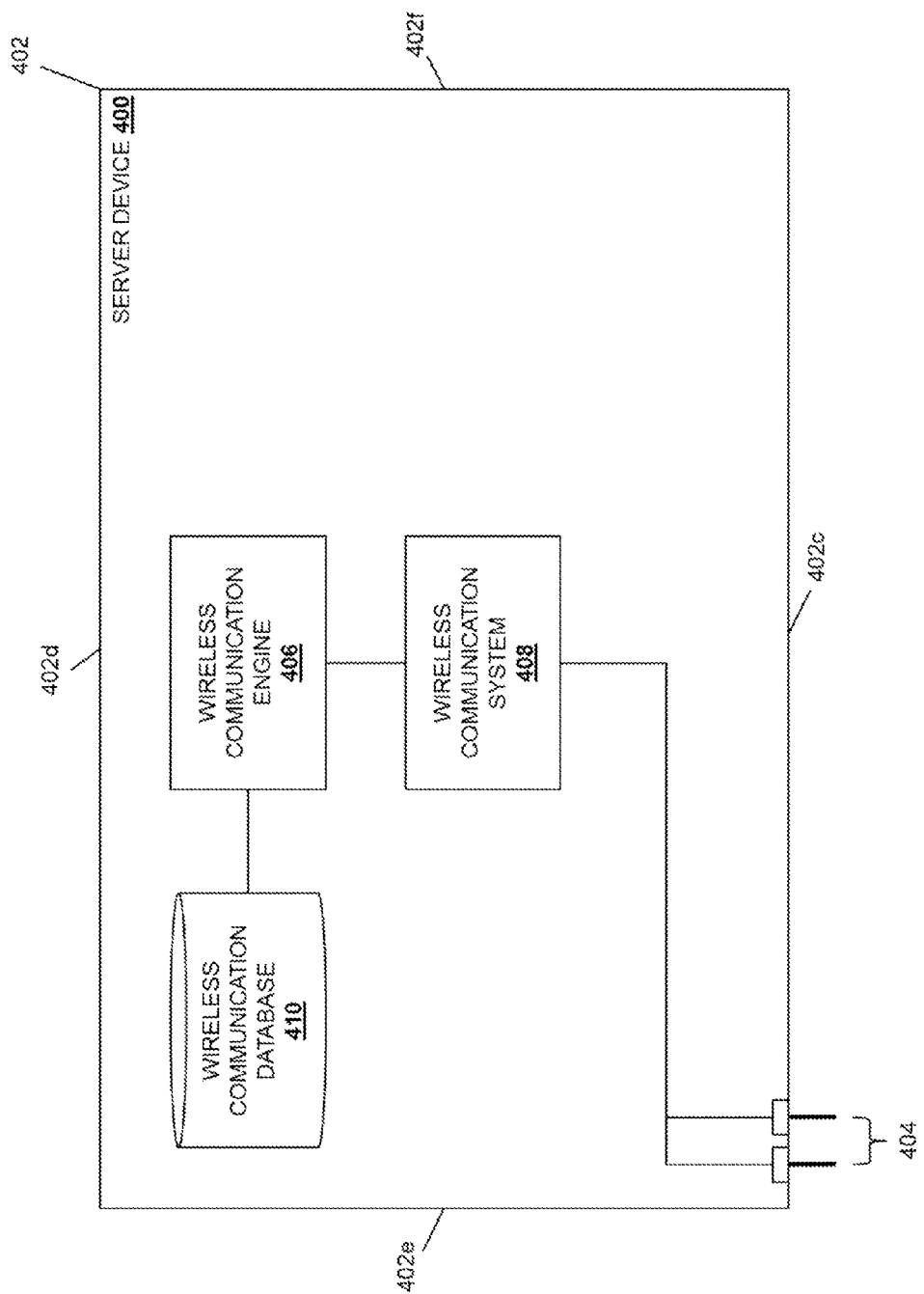
FIG. 4B is a schematic view illustrating an embodiment of the server device of FIG. 4A.

Referring now to FIGS. 4A and 4B, an embodiment of a server device 400 is illustrated. The server device 400 may be the IHS 100 discussed above with reference to FIG. 1 and/or may include some or all of the components of the IHS 100. In specific embodiments discussed below, the server device 400 is illustrated and described as a data center server that provides a computing device that wirelessly communicates with networking device provided by the teachings discussed herein. However, in other embodiments the computing device of the present disclosure may be provided instead by storage devices in a Storage Area Network (SAN)) and/or other types of rack devices while remaining within the scope of the present disclosure. The server device 400 includes a chassis 402 having a top surface 402a, a bottom surface 402b that is located opposite the chassis 402 from the top surface 402a, a front surface 402c extending between the top surface 402a and the bottom surface 402b, a rear surface 402d located opposite the chassis 402 from the front surface 402c and extending between the top surface 402a and the bottom surface 402b, and a pair of side surfaces 402e and 402f located opposite the chassis 402 from each other and extending between the top surface 402a, the bottom surface 402b, the front surface 402c, and the rear surface 402d. While not illustrated, each of the side surfaces 402e and 402f (as well as other surfaces) on the server device 400 may include rack coupling features for engaging the device coupling features 208 on the rack 200 to couple the server device 400 to the rack 200.

In the embodiments discussed below, the front surface 402c of the server device 400 includes an antenna system 404 that extends from the front surface 402c at a location that is adjacent the side surface 402e. In the illustrated embodiment, the antenna system 404 includes a pair of antennas (e.g., antennas 404a and 404b). However, different numbers of antennas (e.g., a single antenna, more than two antennas, etc.) will fall within the scope of the present disclosure. In a specific example, the antennas 404a and 404b in the antenna system 404 may be provided by 802.11ad transmitters and/or receivers (e.g., the antenna 404a in the antenna system 404 may be provided as a transmitter, while the antenna 404b in that antenna system 404 may be provided as a receiver). However, other wireless standards used for internetworking devices may be utilized in the networking device such as, for example, 802.11n, 802.11ac, 802.11ay, Wideband Code Division Multiple Access, 3GPP Long Term Evolution (LTE), etc. While the antennas 404a and 404b in the antenna system 404 are illustrated with straight lines, one of skill in the art in possession of the present disclosure will recognize that antenna(s) used in antenna systems may include a three-dimensional shape/configuration that provides a width and height (as well as the length that is illustrated). For example, the antennas 404a and 404b used for the antenna system 404 may include a width of approximately 5 millimeters and a height of approximately 1-2 millimeters.

In the embodiments discussed below, the antennas 404a and 404b for the antenna system 404 are configured to be coupled to and decoupled from the server device 400. For example, the antennas 404a and 404b for the antenna system 404 may be the 802.11ad transmitters/receivers that are configured to couple to single or dual-Ethernet ports, Fibre Channel ports, SAS ports, PCIE ports, Infiniband ports, USB ports, and/or other ports on the server device 400. In other embodiments, the antenna system 404 may conform to wireless standards such as 802.11n, 802.11ac, 802.11ay, Wideband Code Division Multiple Access, 3GPP Long Term Evolution (LTE), etc. In some embodiments, the antennas 404a and 404b for the antenna system 404 may be coupled to conventional dual Ethernet ports on a structurally conventional server device (that includes the wireless communication engines taught by the present disclosure) to provide the wireless communication functionality discussed below. However, in other embodiments, the server device 400 may be configured with Ethernet ports according to the teachings below in order to provide the wireless communication functionality discussed below. Furthermore, in other embodiments, each of the antennas 404a and 404b in the antenna system 404 may be an integrated component of the server device 400 such that it is not configured to be removed from the front surface 402c of the chassis 402. Thus, one of skill in the art in possession of the present disclosure will recognize that the provisioning of antennas 404a and 404b on the server device 400 to provide the wireless communication functionality discussed below will depend on the configuration of the system (i.e., the rack, the devices in the rack, etc.), and a wide variety of different antenna systems (integrated, port-coupled, combinations thereof, etc.) will fall within the scope of the present disclosure.

Referring now to FIG. 4B, the chassis 402 of the server device 400 may house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a wireless communication engine 406 that is configured to perform the functions of the wireless communication engines and server devices discussed below. The wireless communication engine 406 is coupled to a wireless communication system 408 (e.g., via a coupling between the processing system and the wireless communication system 408) that is coupled to the antenna system 404. In different embodiments, the wireless communication system 408 may be any of a variety of wireless communication systems known in the art. For example, as discussed below, the wireless communication system 408 may be configured to receive wireless communications via the antenna system 404. In an embodiment, the wireless communication system 404 may be provided as per the IEEE 802.11ad specification, the IEE 802.11n specification, the 802.11ac specification, the 802.11ay the specification, the Wideband Code Division Multiple Access specification, the 3GPP Long Term Evolution (LTE) specification, etc. However, one of skill in the art in possession of the present disclosure will recognize that other wireless communication techniques will fall within the scope of the present disclosure. The wireless communication engine 408 is also coupled to a storage device (not illustrated, but which may be the storage device 108, discussed above with reference to FIG. 1, that is coupled to the processing system) that includes a wireless communication database 410 which may store any information used in the communications with the networking device as discussed below.

Referring now to FIG. 5, an embodiment of a method 500 for maintaining device/PHY mappings is illustrated. As discussed in further detail below, the networking device 300 provides an embodiment of a device/PHY mapping maintaining system that provides wireless communications with server devices that result in server/PHY mappings based on, for example, the configuration of PHYs in the networking device 300 for server devices communicating using those PHYs. The server devices 400 may wirelessly connect to a first antenna system on the networking device 300 that is coupled to a first PHY via a first radio processing engine to cause the device/PHY mapping to be created, and subsequently wirelessly communicate through the network via that first antenna system and first PHY. In the event that server device then begins communicating with a second antenna system on the networking device 300 that is coupled to a second PHY via a second radio processing engine (e.g., due to movement of the server device to a different location in a rack or outside of the rack, due to the first radio processing engine becoming unavailable the, etc.), the networking device includes an antenna/radio switch matrix and a PHY/radio switch matrix that are configurable to connect the second antenna system to the first PHY that was configured for that server device in order to maintain the device/PHY mapping. In some examples, the antenna/radio switch matrix may connect the second antenna system to the first radio processing engine that is coupled to the first PHY. In another example, the PHY/radio switch matrix may connect the second radio processing engine (that is coupled to the second antenna system) to the first PHY. In yet another example, the antenna/radio switch matrix may connect the second antenna system to a third radio processing engine, and the PHY/radio switch matrix may connect the third radio processing engine to the first PHY. As such, device/PHY mappings are automatically maintained without the need for an administrator to manually reconfigure the networking device when server devices are moved or otherwise need to communicate using other antenna systems.

The method 500 begins at block 502 where a networking device and at least one server device are provided. As discussed above, in some embodiments, some or all of the components of the networking system 300 may be modular and configured to couple to a backplane in the networking device 300. For example, a backplane in the networking device 300 may be provided that includes the central processing engine 312, the PHY/radio switch matrix 320, the antenna/radio switch matrix 322, and a plurality of connectors, and at block 502 the network processing engine 316, the radio processing engines 318a-c, and/or the antenna systems 304, 306, and 308 may be coupled to those connectors to provide the networking device 300.

Figure 6A:
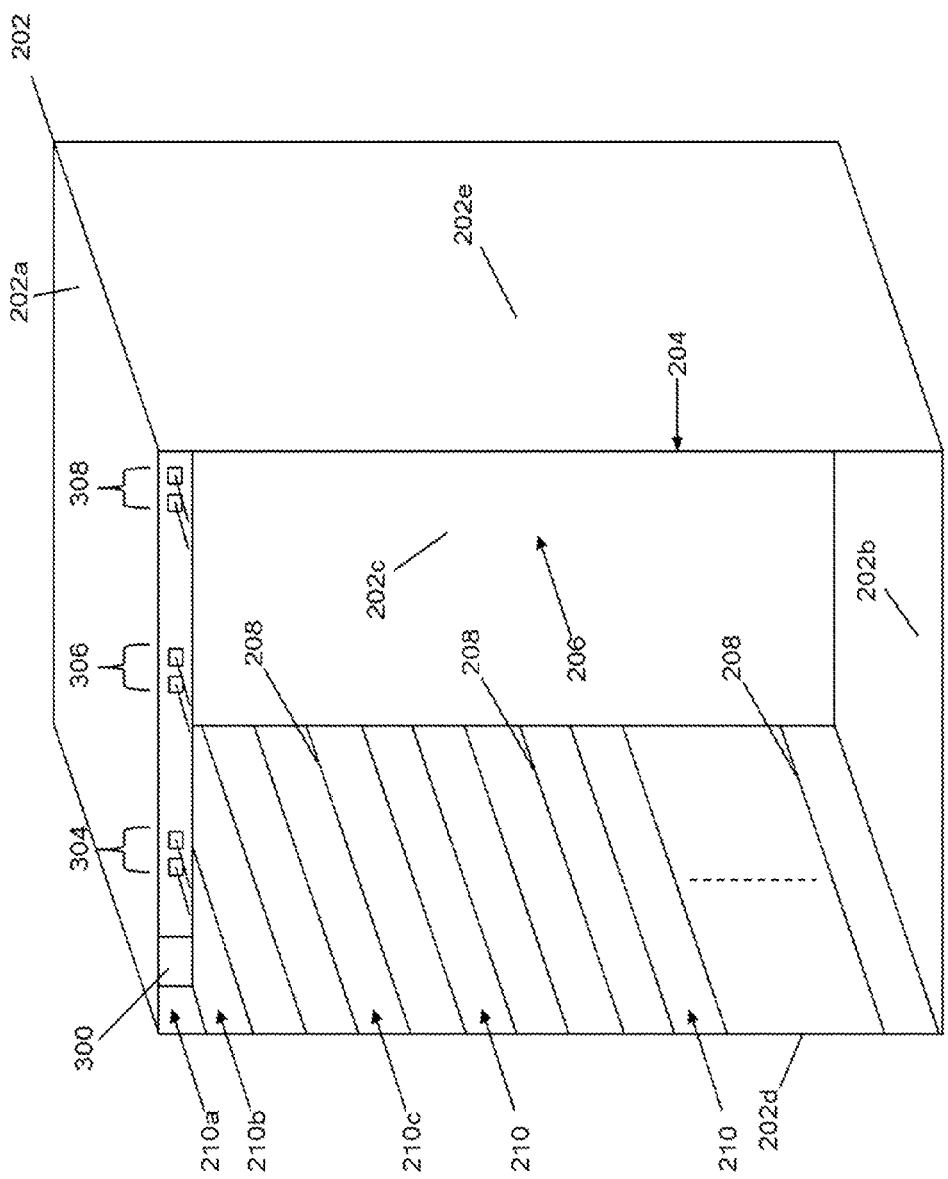
FIG. 6A is a perspective view illustrating an embodiment of the networking device of FIGS. 3A and 3B positioned in the rack of FIG. 2.

Referring now to FIG. 6A, in an embodiment of block 502, the rack 200 illustrated in FIG. 2 is provided, and the networking device 300 illustrated in FIGS. 3A and 3B is positioned in the first device housing 210a defined by the rack base 202. For example, the networking device 300 may be positioned adjacent the first device housing 210a on the rack 200 such that the rear surface 302d of the chassis 302 for the networking device 300 is aligned with the first device housing 210a, and then the networking device 300 is moved towards the rack 200 such that the chassis 302 of the networking device 300 enters the first device housing 210a and the rack coupling features on the side surfaces 302e and 302f of the chassis 302 engage the device coupling features 208 on the side walls 202d and 202e of the rack 200. The networking device 300 may then be moved through the first device housing 210a until the networking device 300 is fully positioned in the rack 200. FIG. 6A illustrates an embodiment of the networking device 300 fully positioned in the first device housing 210a. In that embodiment, the front surface 302c of the networking device 300 is spaced apart from the rack entrance 204 of the rack 200 such that the antennas on the antenna systems 304, 306, and 308 do not extend past the rack entrance 204 of the rack 200. However, in some embodiments the extension of the antennas in the antenna systems 304, 306, and 308 past the rack entrance 204 (e.g., by a longer antenna, by a cable that extends the antenna, etc.) will fall within the scope of the present disclosure.

Figure 6B:
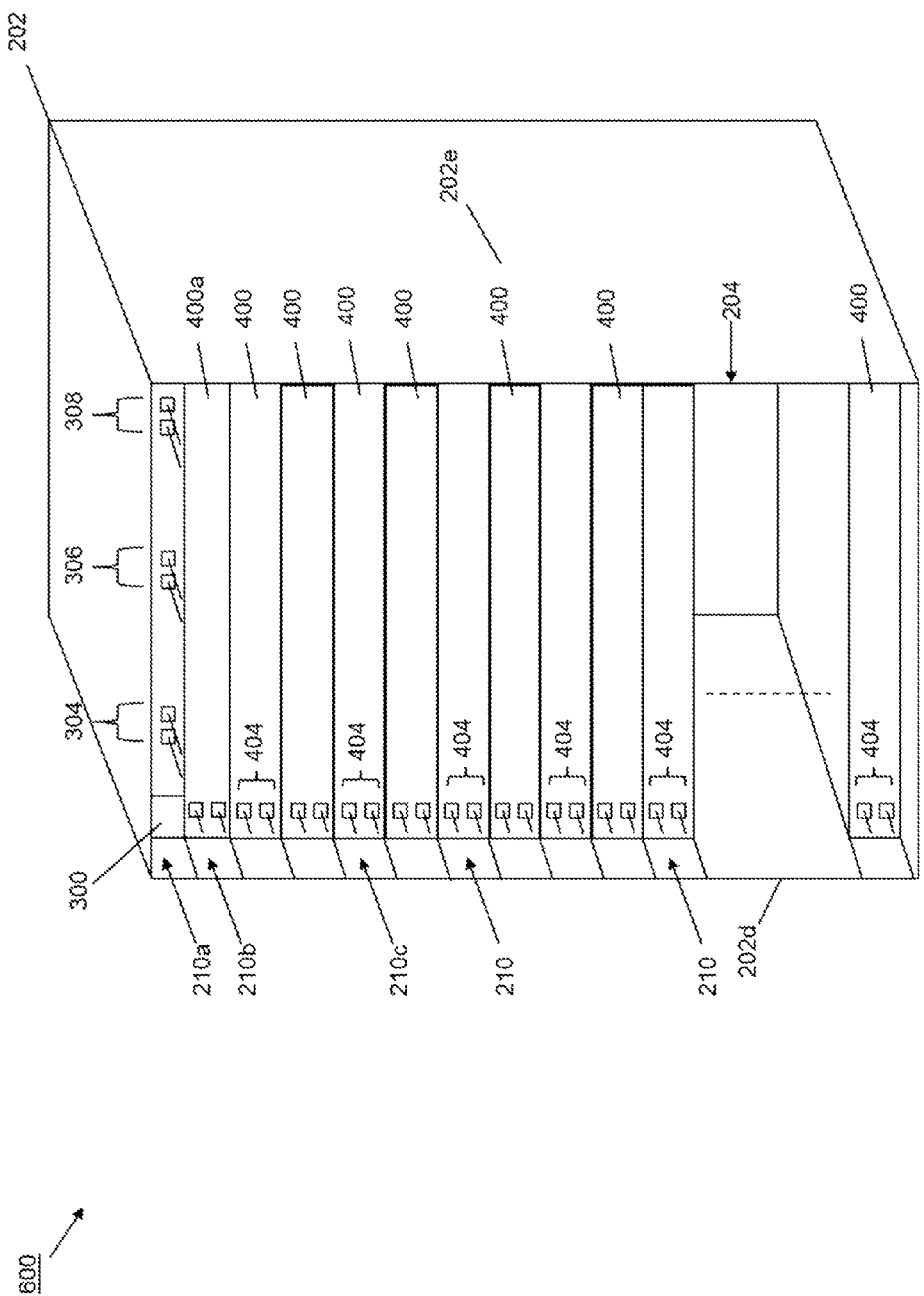
FIG. 6B is an embodiment of a plurality of the service devices of FIGS. 4A and 4B positioned in the rack of FIG. 2 with the networking device of FIGS. 3A and 3B.

Referring now to FIG. 6B, one of the server devices 400 illustrated in FIGS. 4A and 4B may be positioned in any or all of the second device housings 210 defined by the rack base 202. For example, a server device 400a may be positioned adjacent one of the second device housings 210b on the rack 200 such that the rear surface 402d of the chassis 402 for the server device 400a is aligned with that second device housing 210b, and then the server device 400a is moved towards the rack 200 such that the chassis 402 of the server device 400a enters that second device housing 210b and the rack coupling features on the side surfaces 402e and 402f of the chassis 402 engage the device coupling features 208 on the side walls 202d and 202e of the rack 200. The server device 400a may then be moved through the second device housing 210b until the server device 400a is fully positioned in the rack 200. Similarly, a server device 400 may be positioned in the second devices housing 210c as well as in any of the second devices housings 210 as illustrated. FIG. 6B illustrates an embodiment of a server/PHY mapping maintaining system 600 with the networking device 300 fully positioned in the first device housing 210a and a plurality of the server devices 400 fully positioned in the remaining device housings 210 (of which the second device housings 210b and 210c are discussed below). In that embodiment, the front surfaces 402c of the server devices 400 are spaced apart from the rack entrance 204 of the rack 200 such that the antennas 404a and 404b on the antenna systems 404 do not extend past the rack entrance 204 of the rack 200. However, in some embodiments the extension of the antennas in the antenna system 404 past the rack entrance 204 will fall within the scope of the present disclosure.

The method 500 then proceeds to block 504 where a device/PHY mapping between a server device and a PHY in the networking device is provided when the server device communicates with an antenna system on the networking device. In the examples provided below, the device/PHY mapping is provided at block 504 between the server devices 400 and PHYs in the networking device 300 that are all positioned in the same rack 200. However, device/PHY mappings may be provided at block 504 between the different types of devices (e.g., storage devices) that need not be positioned in the rack 200 while remaining within the scope of the present disclosure. In an embodiment of block 504, the central processing engine 312 in the networking device 300 operates to determine when a server device 400 is communicating with one of the antenna systems 304, 306, and 308 and, in response, connects that server device 400 to one of the PHYs 316a, 316b, and 316c through one of the radio processing engines 318a, 318b, and 318c. Following the connection of the server device 400 to one of the PHYs 316a, 316b, and 316c, the network processing engine 316 and/or the central processing engine 312 may provide the device/PHY mapping by configuring that PHY to operate with the server device 400 by, for example, configuring a VLAN, configuring an ACL, configuring a Link Aggregation Group (LAD), configuring a Virtual Link Trunk/Multitask LAG (VLT/MLAG), configuring Software Defined Networking (SDN) service flows, configuring bandwidth limitations and/or port speed, configuring protocol specific configurations for the port, and/or performing a variety of other PHY configurations and/or device/PHY mapping operations known in the art. Following the provisioning of the device/PHY mapping, that device/PHY mapping and/or details of that device/PHY mapping may be stored in the mapping database 314.

Figure 6D:
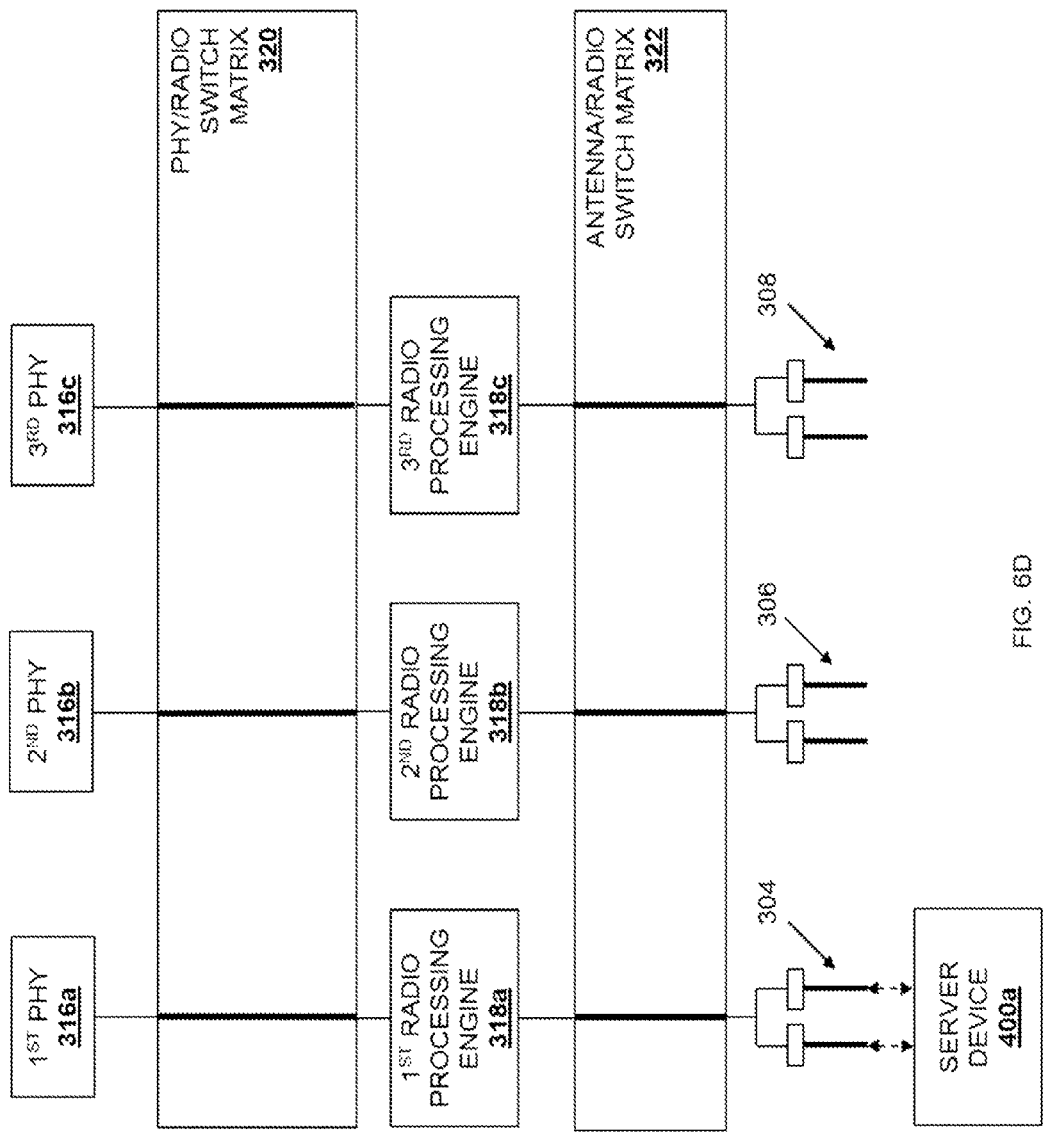
FIG. 6D is a schematic view illustrating the provisioning of communications to one of the server devices of FIG. 6C using the components of the networking device.

For example, referring now to FIGS. 6C and 6D, wireless communications between the networking device 300 and the server device(s) 400 that may result in device/PHY mappings are illustrated. In one example, the networking device 300 may be powered on, reset, booted up, and/or otherwise initiated. In a specific example, the server device 400a in the second device housing 210b may then also be powered on, reset, booted up, and/or otherwise initiated. In response to being initiated, the wireless communication engine 406 in the server device 400a may use its wireless communication system 408 and its antenna system 404 to wirelessly communicate with the antenna system 304 on the networking device 300 as illustrated, and the central processing engine 312 in the networking device 300 may then configure the antenna/radio switch matrix 322 and the PHY/radio switch matrix 320 to connect the antenna system 304 to the first PHY 316a. FIG. 6D illustrates the antenna/radio switch matrix 322 and the PHY/radio switch matrix 320 configured to connect the antenna system 304 to the first radio processing engine 318a (illustrated by a bold black line provided by the antenna/radio switch matrix 322 between the antenna system 304 and the first radio processing engine 318a), and to connect the first radio processing engine 318a to the first PHY 316a (illustrated by a bold black line provided by the PHY/radio switch matrix 320 between the first radio processing engine 318a and the first PHY 316a.) Subsequent to the connection of the antenna system 304 to the first PHY 316a, the first PHY 316a may be configured for the server device 400a to provide the device/PHY mapping, and that mapping may be stored in the mapping database 314.

In an embodiment, FIG. 6D may illustrate a "default" embodiment in which the antenna system 304 is coupled to the first PHY 316a through the first radio processing engine 318a as discussed above, the antenna/radio switch matrix 322 and the PHY/radio switch matrix 320 are configured to connect the antenna system 306 to the second radio processing engine 318b (illustrated by a bold black line provided by the antenna/radio switch matrix 322 between the antenna system 306 and the second radio processing engine 318b) and the second radio processing engine 318b to the second PHY 316b (illustrated by a bold black line provided by the PHY/radio switch matrix 320 between the second radio processing engine 318b and the second PHY 316b), and the antenna/radio switch matrix 322 and the PHY/radio switch matrix 320 are configured to connect the antenna system 308 to the third radio processing engine 318c (illustrated by a bold black line provided by the antenna/radio switch matrix 322 between the antenna system 308 and the third radio processing engine 318c) and the third radio processing engine 318c to the third PHY 316c (illustrated by a bold black line provided by the PHY/radio switch matrix 320 between the third radio processing engine 318c and the third PHY 316c). However, other configurations of the PHY/radio switch matrix 320 and the antenna/radio switch matrix 322 are envisioned as falling within the scope of the present disclosure.

Referring back to FIG. 6C, the other server devices 400 in the rack 200 may wirelessly communicate with the antenna systems 304, 306, or 308 in order to have device/PHY mappings provided substantially as discussed above for the server device 400a. In the illustrated embodiment, subsets of three server devices are illustrated wirelessly communicating with each of the antenna systems 304, 306, and 308, with a first subset of the server devices 400 closest to the networking device 300 communicating with the antenna system 304, a second subset of the server devices 400 furthest from the networking device 300 communicating with the antenna system 308, and a third subset of the server devices 400 illustrated between the first subset and the second subset communicating with the antenna system 306. While such a configuration may be beneficial in providing unobstructed wireless communication paths, one of skill in the art in possession of the present disclosure will recognize that other communications paths will fall within the scope of the present disclosure. With reference back to FIG. 6D, in an embodiment of block 504, each of the first subset of server devices 400 may be provided a device/PHY mapping with the first PHY 316a, each of the second subset of server devices 400 may be provided a device/PHY mapping with the third PHY 316c, and each of the third subset of server devices 400 may be provided a device/PHY mapping with the second PHY 316b.

The method 500 then proceeds to decision block 506 where it is determined whether a server device is communicating with a different antenna system on the networking device. In the embodiments discussed below, the server device 400a begins communicating with the antenna system 306 (after initially communicating with the antenna system 304) in response to being moved from the second device housing 210b in the rack 200 to the second device housing 210c in the rack 200. However, in some embodiments, service devices may begin communicating with a different antenna system on the networking device 300 without being moved to a different location. For example, the server device 400a may be communicating with the antenna system 304, and the first radio processing engine 318a and/or antenna system 304 may lose power, experience Radio Frequency (RF) interference or blocked connectivity, and/or otherwise "go down" such that the server device 400a can no longer communicate using the antenna system 304 and then switches to communicating using the antenna system 306. Furthermore, in some embodiments server devices may begin communicating with a different antenna system on the networking device 300 in response to being moved out of the rack 200 (i.e., to a different rack). Thus, server devices may begin communicating with a different antenna system for a variety of reasons that will fall within the scope of the present disclosure.

In an embodiment, the central processing engine 312 may be configured to determine when a server device 400 that was communicating using an antenna system switches to communicating using a different antenna system. For example, the central processing engine 312 may be configured to determine that a Media Access Control (MAC) address received in a communication through an antenna system was previously received through a different antenna system and, in response, determine that a server device associated with that MAC address is using a different antenna system to communicate with the networking device. For example, the networking processing engine 316 may provide server device identifiers (e.g., MAC addresses) received in communications through antenna systems to the central processing engine 312, and the central processing engine 312 may determine whether those server device identifiers were previously received through different antenna systems (e.g., using the information in the mapping database 314, which may include details such as which antenna system was associated with a server/PHY mapping). However, any other technique for determining that a server device has switched its use of antenna systems on the networking device for wireless communication is envisioned as falling within the scope of the present disclosure. If at decision block 506 it is determined that no server device is communicating with a different antenna system, the method 500 returns to block 504 where the device/PHY mapping is provided as discussed above.

Figure 7:
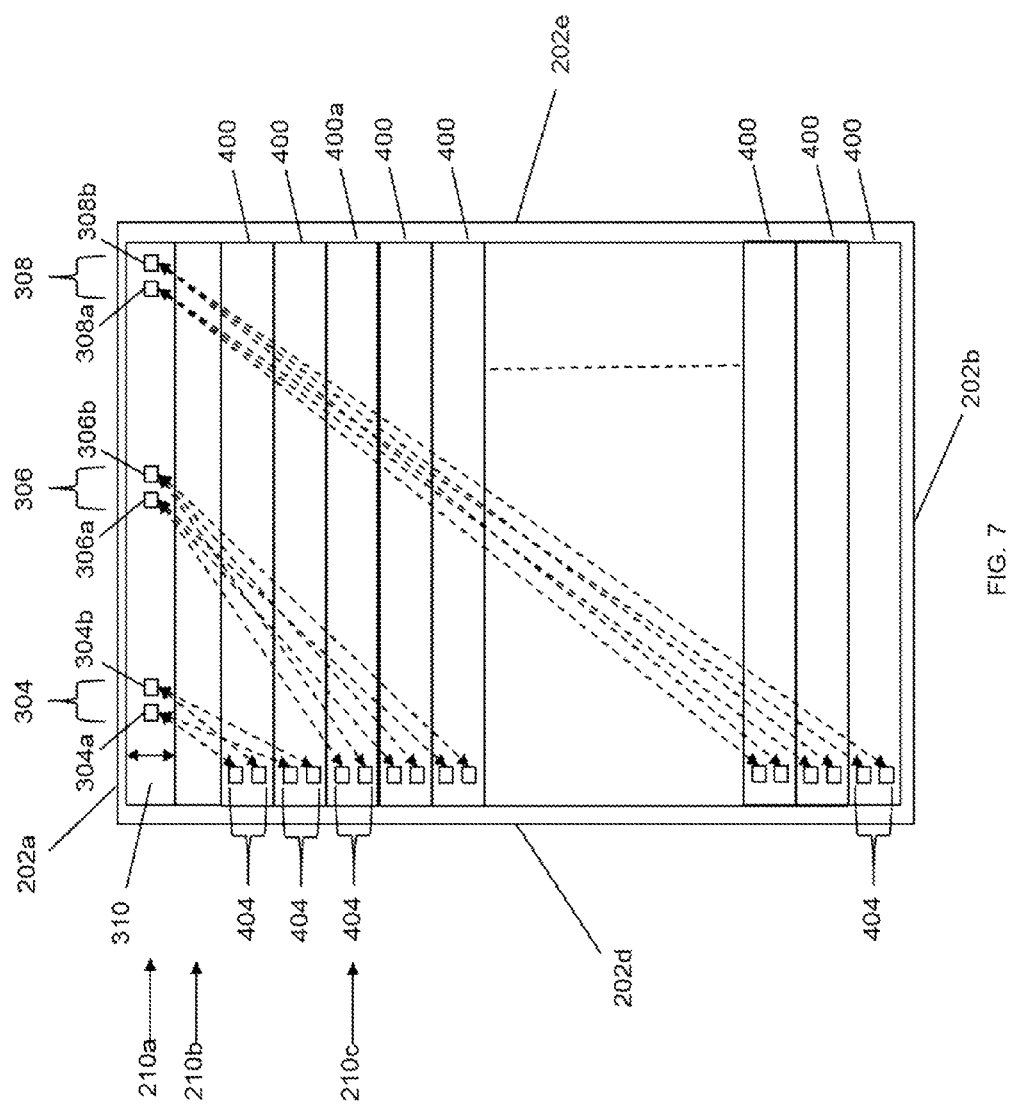
FIG. 7 is a front view illustrating an embodiment of communications between the networking device and the server devices in the rack of FIG. 6B after a first server device has been moved such that it communicates via a different antenna system on the networking device.
Figure 8:
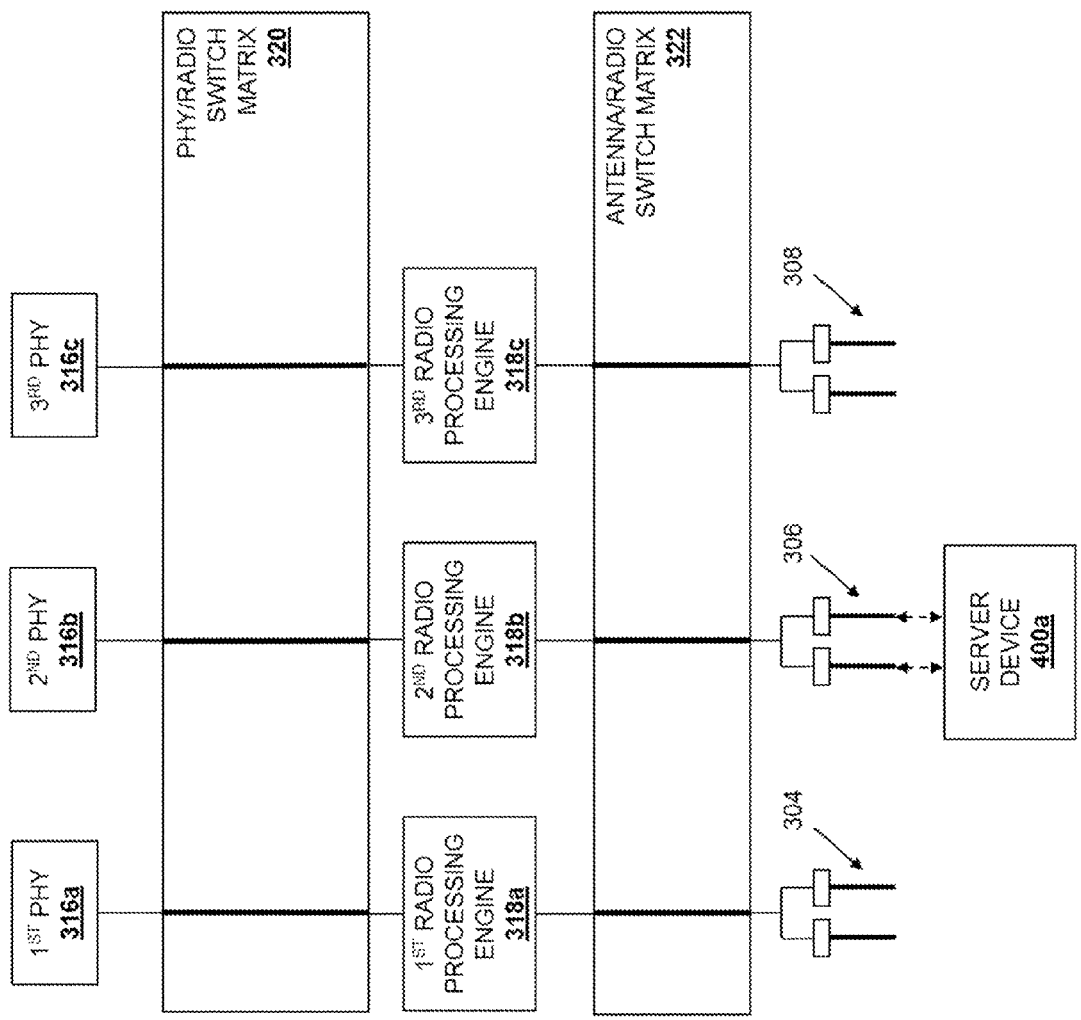
FIG. 8 is a schematic view illustrating the provisioning of communications to the first server device of FIG. 7 using the components of the networking device.

FIG. 7 illustrates the server device 400a, which was previously located in the second device housing 210b as illustrated in FIG. 6C, having been removed from the second device housing 210b and positioned in the second device housing 210c. As can be seen, in response to being moved from the second device housing 210b to the second device housing 210c, the server device 400a has begun communicating using the antenna system 306 on the networking device 300. With reference to FIG. 6D and as discussed above, the antenna/radio switch matrix 322 and the PHY/radio switch matrix 320 may have(been configured to connect the antenna system 306 to the second radio processing engine 318b (illustrated by a bold black line provided by the antenna/radio switch matrix 322 between the antenna system 306 and the second radio processing engine 318b) and the second radio processing engine 318b to the second PHY 316b (illustrated by a bold black line provided by the PHY/radio switch matrix 320 between the second radio processing engine 318b and the second PHY 316b). At decision block 506, the central processing engine 312 may receive a server device identifier from the networking processing engine 316 (e.g., extracted from communications from the server device 400a received at the second PHY 316b) and determine that the server device 400a was previously communicating with the first PHY 316a (e.g., via information in the mapping database 314). As discussed above, the determination that a server device is communicating with a different antenna system may be performed in response to the server device switching communications to a different antenna system for any reason known in the art, and not only in response to a relocation of the server device within the rack 200.

In response to determining that the server device is communicating with a different antenna system at decision block 506, the method 500 then proceeds to block 508 where the networking device maintains the device/PHY mapping between the server device and the PHY in the networking device by connecting the different antenna system and the PHY. The device/PHY mapping results in the networking processing engine 316 "expecting" a particular server device to be communicating on a particular one of its PHYs, and the central processing engine 312 may configure the PHY/radio switch matrix 320 and/or the antenna/radio switch matrix 322 to ensure that that particular server device continues communicating on that particular PHY. As discussed below, the maintaining of the device/PHY mapping may be made in response to a variety of scenarios involving the radio processing engines 318a-c. However, the examples of maintaining the device/PHY mapping based on radio processing engine scenarios are provided below merely as examples, and one of skill in the art in possession of the present disclosure will recognize that the PHY/radio switch matrix 320 and/or the antenna/radio switch matrix 322 may be used to maintain the device/PHY mapping in response to a variety of other situations known in the art that will fall within the scope of the present disclosure. In an embodiment, the central processing engine 312 operates at block 508 to configure the PHY/radio switch matrix 320 and/or the antenna/radio switch matrix 322 in order to connect the different antenna system with which the server device 400a is now communicating (i.e., the antenna system 306 in this embodiment) and the PHY that was configured for the server device 400a according to the device/PHY mapping (i.e., the first PHY 316a) in order to maintain that device/PHY mapping.

Figure 9:
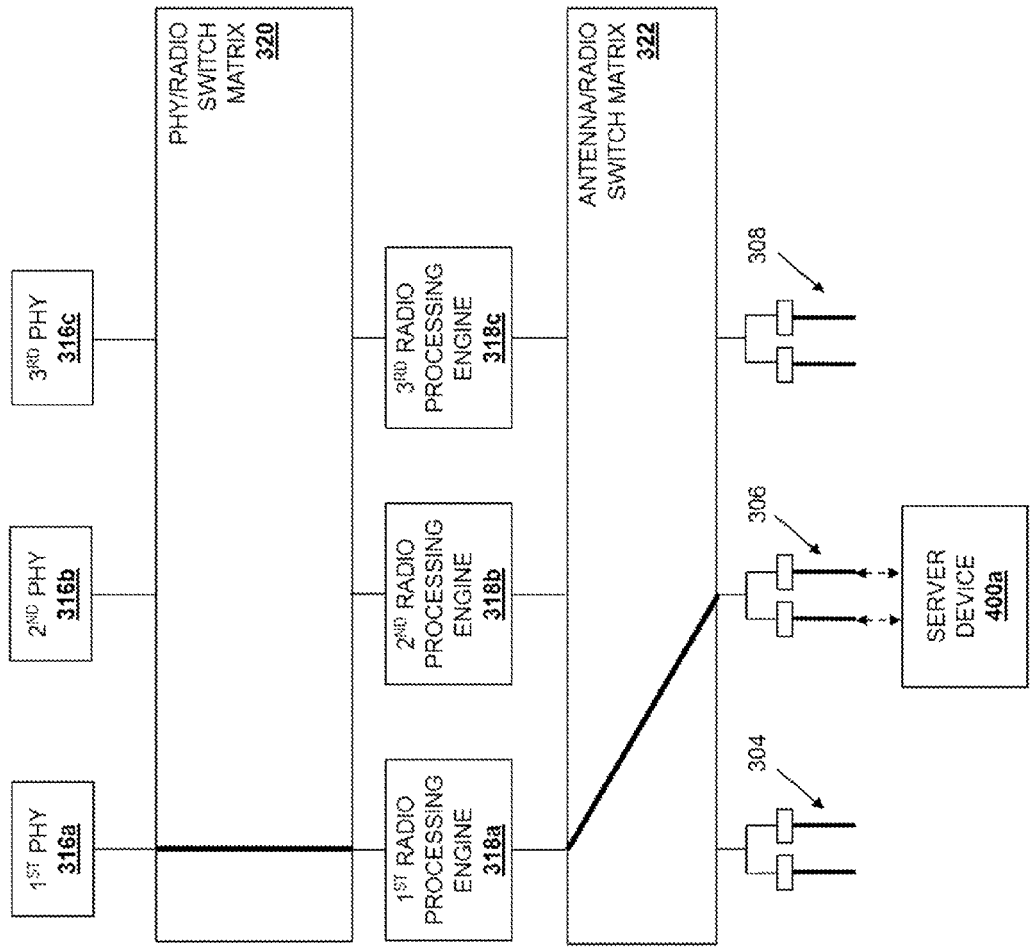
FIG. 9 is a schematic view illustrating the provisioning of communications to the first server device of FIG. 7 using the components of the networking device.

FIG. 9 illustrates an embodiment of the antenna/radio switch matrix 322 configured to connect the antenna system 306 to the first radio processing engine 318a (illustrated by a bold black line provided by the antenna/radio switch matrix 322 between the antenna system 306 and the first radio processing engine 318a) that was previously connected to the first PHY 316a (illustrated by a bold black line provided by the PHY/radio switch matrix 320 between the first radio processing engine 318a and the first PHY 316a in FIG. 6C). In some embodiments, such a configuration of the antenna/radio switch matrix 322 may be performed by the central processing engine 312 when the second radio processing engine 318b becomes overloaded due to the new communications received by the server device 400a through the antenna system 306. For example, overloading of the second radio processing engine 318b may occur in response to the second radio processing engine 318b not having enough bandwidth to handle the communications received from the server device 400a through the antenna system 306, the second radio processing engine 318b already handling its maximum number of clients devices, the second radio processing engine 318b already handling its maximum amount of traffic, the second radio processing engine 318b providing a maximum number of radio links, the second radio processing engine 318b having maxed out its radio transmit power, the second radio processing engine 318b having maxed out its radio transmit error rate, the second radio processing engine 318b having maxed out its radio communications congestion capability, and/or due to a variety of other overloading factors known in the art. As such, the configuration of the antenna/radio switch matrix 322 in FIG. 9 provides for communications from the server device 400a received at the antenna system 306 to be provided to the first radio processing engine 318a (which was previously was handling communications from the server device 400a and is not overloaded by those communications). The previous configuration of the PHY/radio switch matrix 320 then provides those communications from the first radio processing engine 318a to the first PHY 316a which, as discussed above, is configured for the server device 400a. Thus, the configuration of the antenna/radio switch matrix 322 in FIG. 9 operates to maintain the device/PHY mapping between the server device 400a and the first PHY 316a, and any further communications received by the server device 400a at the antenna system 306 may be provided to the first PHY 316a.

Figure 10:
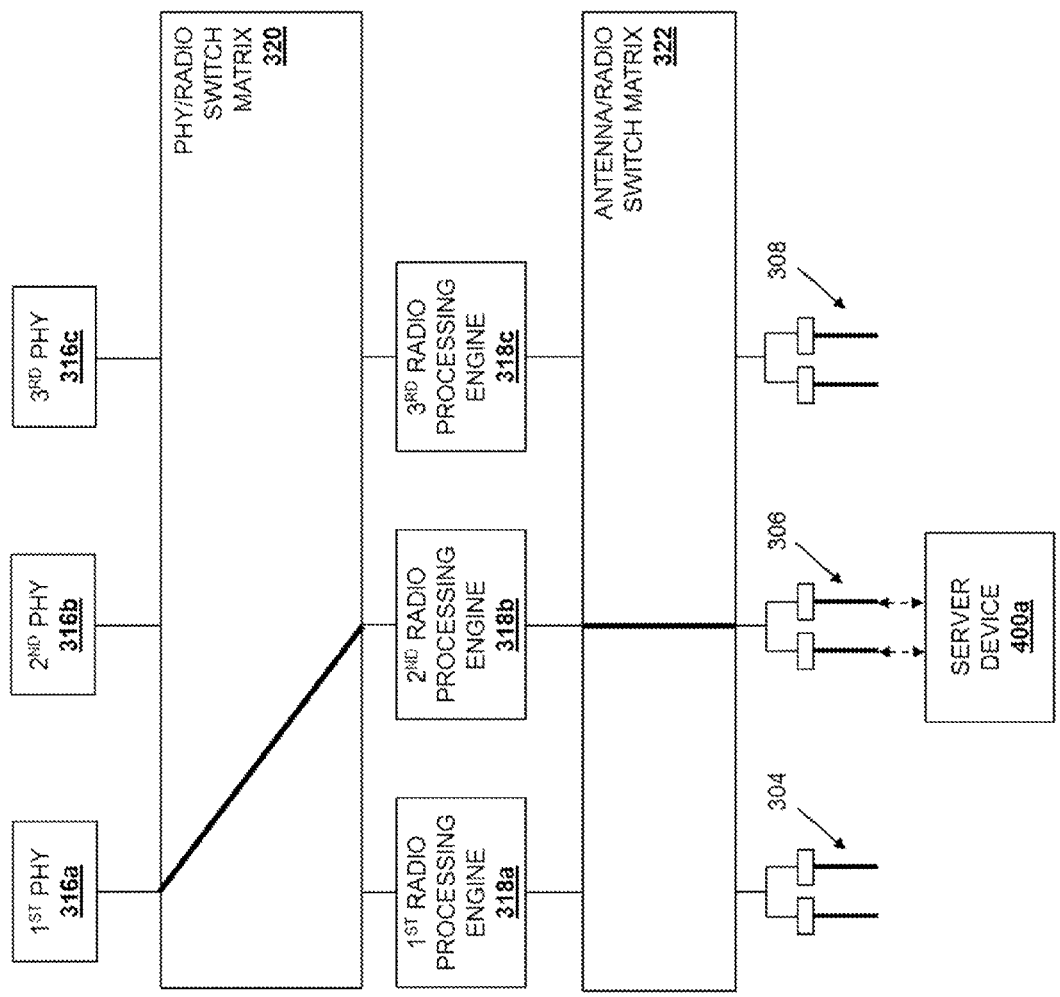
FIG. 10 is a schematic view illustrating the provisioning of communications to the first server device of FIG. 7 using the components of the networking device.

FIG. 10 illustrates an embodiment of the PHY/radio switch matrix 320 configured to connect the second radio processing engine 318b to the first PHY 316a (illustrated by a bold black line provided by the PHY/radio switch matrix 320 between the second radio processing engine 318b and the first PHY 316a). As discussed above with reference to FIG. 6C, the second radio processing engine 318b was previously connected to the second antenna system 306 (illustrated by a bold black line provided by the antenna/radio switch matrix 322 between the antenna system 306 and the second radio processing engine 318b). In an embodiment, such a configuration of the PHY/radio switch matrix 320 may be performed by the central processing engine 312 when the second radio processing engine 318b is capable of handling the communications from the server device 400a received through the antenna system 306 (i.e., the second radio processing engine 318b is not overloaded by those communications). As such, the configuration of the PHY/radio switch matrix 320 in FIG. 10 provides for communications from the server device 400a that are received at the antenna system 306 and provided to the second radio processing engine 318b (due to the previous configuration of the antenna/radio switch matrix 322) to be provided to the first PHY 316a which, as discussed above, is configured for the server device 400a. Thus, the configuration of the PHY/radio switch matrix 320 operates to maintain the device/PHY mapping between the server device 400a and the first PHY 316a, and any further communications received by the server device 400a at the antenna system 306 may be provided to the first PHY 316a.

Figure 11:
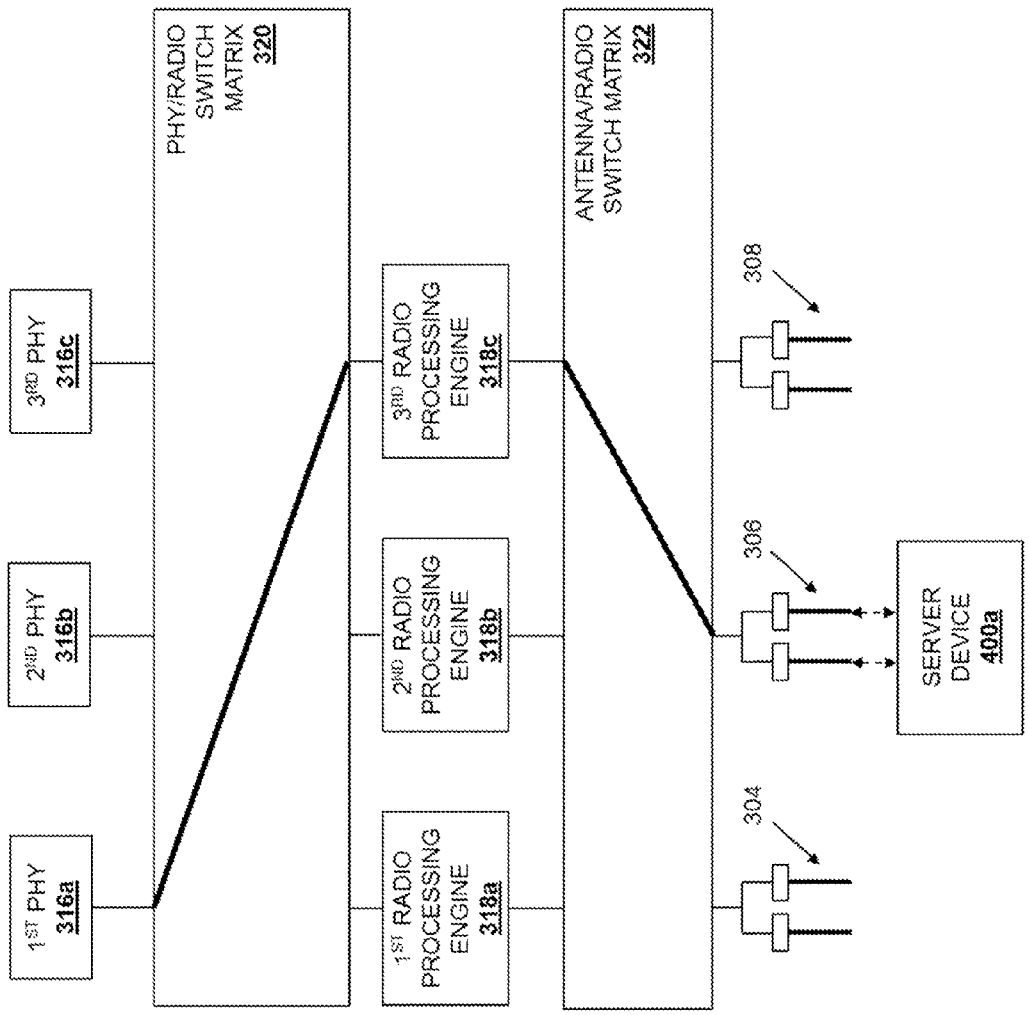
FIG. 11 is a schematic view illustrating the provisioning of communications to the first server device of FIG. 7 using the components of the networking device.

FIG. 11 illustrates an embodiment of the antenna/radio switch matrix 322 configured to connect the antenna system 306 to the third radio processing engine 318c (illustrated by a bold black line provided by the antenna/radio switch matrix 322 between the antenna system 306 and the third radio processing engine 318c), and the PHY/radio switch matrix 320 configured to connect the third radio processing engine 318c to the first PHY 316a (illustrated by a bold black line provided by the PHY/radio switch matrix 320 between the third radio processing engine 318c and the first PHY 316a). In an embodiment, such a configuration of the antenna/radio switch matrix 322 and the PHY/radio switch matrix 320 may be performed by the central processing engine 312 when neither of the first radio processing engine 318a and the second radio processing engine 318b are capable of handling the communications from the server device 400a received through the antenna system 306 (i.e., the first and/or second radio processing engines are overloaded by those communications, not available, etc.). As such, the configuration of the antenna/radio switch matrix 322 and the PHY/radio switch matrix 320 in FIG. 11 provide for communications from the server device 400a received at the antenna system 306 to be provided to the third radio processing engine 318c and then to the first PHY 316a which, as discussed above, is configured for the server device 400a. Thus, the configuration of the antenna/radio switch matrix 322 and the PHY/radio switch matrix 320 operates to maintain the device/PHY mapping between the server device 400a and the first PHY 316a, and any further communications received by the server device 400a at the antenna system 306 may be provided to the first PHY 316a.

The method 500 may then proceed to optional block 510 where the signal strength of communications may be increased between the different antenna system and the PHY. In some embodiments, the communication distance between antenna systems 304, 306, or 308; radio processing engines 318a, 318b, or 318c; and/or the PHYs 316a, 316b, or 316c in the networking processing engine 316 may increase due to the reconfigurations of the antenna/radio switch matrix 322 and/or the PHY/radio switch matrix 320. In such embodiments, the antenna/radio switch matrix 322 and/or the PHY/radio switch matrix 320 may include subsystems for cleaning, energizing, boosting, and/or otherwise increasing the signal strength of the communications received through the different antenna system (e.g., the antenna system 306 in the embodiments discussed above) from the server device 400a so that those communications may be transmitted as discussed above to the first PHY 316a. However, in some embodiments, the communications received through the antenna system 306 may be sufficient to transmit to the first PHY 316a without any increases in the signal strength of those communications.

Thus, systems and methods have been described that provide for the maintaining of device/PHY mappings in a wireless communications system that provides for high mobility of devices such that they may easily and often connect to different PHYs via different antenna systems available to receive their communications. As discussed above, switch matrices may be provided between the antenna systems and radio processing engines, and between the radio processing engines and PHYs, and when server devices start communicating through different antenna systems, the switch matrices may be configured based on the status of the radio processing engines in order to maintain the device/PHY mapping between the device and the PHY that is configured for that device. As such, mobility of the server devices is maintained in the wireless communication system while preventing the need for manual configuration of the networking device with which the server devices communicates each time those server devices communication with a different antenna system. While not described above, the networking device 300 may be provided by a networking card in a system chassis that also may house a plurality of server cards that interact with the networking card in substantially the same manner as discussed above between the server devices and the networking device, and one of skill in the art in possession of the present disclosure would recognize that the techniques described herein would allow the server cards in the system chassis to be moved to different positions within the system chassis while experiencing the same benefits as the moving server devices described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device/PHY mapping maintaining system, comprising:
   a rack;
   a server device that is configured to be positioned in the rack; and a networking device that is located in the rack and that is configured to:
provide a device/PHY mapping between the server device and a first PHY in the networking device when the server device communicates with a first antenna system on the networking device that is connected to the first PHY through a first radio processing engine in the networking device;
determine that the server device is communicating with a second antenna system on the networking device that is connected to a second PHY in the networking device through a second radio processing engine in the networking device; and
connect the second antenna system to the first PHY to maintain the device/PHY mapping between the server device and the first PHY, wherein the connecting of the second antenna system to the first PHY includes connecting at least one of the second antenna system and the first PHY to a different radio processing engine in the networking device.

2. The system of claim 1, wherein the connecting the second antenna system to the first PHY includes connecting the second antenna system to the first radio processing engine that is connected to the first PHY.

3. The system of claim 1, wherein the connecting the second antenna system to the first PHY includes connecting the first PHY to the second radio processing engine that is connected to the second antenna system.

4. The system of claim 1, wherein the connecting the second antenna system to the first PHY includes connecting each of the second antenna system and the first PHY to a third radio processing engine in the networking device.

5. The system of claim 1, wherein the networking device is configured to:
increase a signal strength of communications received from the server device for transmission between the second antenna system and the first PHY.

6. The system of claim 1, wherein server device communicates with the first antenna system while positioned in a first location in the rack, and wherein the server device communicates with the second antenna system when relocated to a second location in the rack.

7. An Information Handling System (IHS), comprising:
a database storing a device/PHY mapping;
a networking processing system including a plurality of PHYs;
a plurality of radio processing engines;
a PHY/radio switch matrix coupling the plurality of PHYs to the plurality of radio processing engines;
a plurality of antenna systems;
an antenna/radio switch matrix coupling the plurality of antenna systems to the plurality of radio processing engines; and
a central processing engine that is coupled to the database, the PHY/radio switch matrix, and the antenna/radio switch matrix, wherein the central processing engine is configured to:
provide the device/PHY mapping between a device and a first PHY of the plurality of PHYs when the device communicates with a first antenna system of the plurality of antenna systems that is connected to the first PHY through connections provided by the PHY/radio switch matrix and the antenna/radio switch matrix to a first radio processing engine of the plurality of radio processing engines;
determine that the device is communicating with a second antenna system of the plurality of antenna systems that is connected to a second PHY of the plurality of PHYs through connections provided by the PHY/radio switch matrix and the antenna/radio switch matrix to a second radio processing engine of the plurality of radio processing engines; and
connect the second antenna system to the first PHY to maintain the device/PHY mapping between the device and the first PHY, wherein the connecting of the second antenna system to the first PHY includes connecting at least one of the second antenna system and the first PHY to a different radio processing engine of the plurality of radio processing engines using at least one of the PHY/radio switch matrix and the antenna/radio switch matrix.

8. The IHS of claim 7, wherein the connecting the second antenna system to the first PHY includes using the antenna/radio switch matrix to connect the second antenna system to the first radio processing engine that is connected to the first PHY.

9. The IHS of claim 7, wherein the connecting the second antenna system to the first PHY includes using the PHY/radio switch matrix to connect the first PHY to the second radio processing engine that is connected to the second antenna system.

10. The IHS of claim 7, wherein the connecting the second antenna system to the first PHY includes using the antenna/radio switch matrix and the PHY/radio switch matrix to connect each of the second antenna system and the first PHY to a third radio processing engine of the plurality of radio processing engines.

11. The IHS of claim 7, wherein at least one of the antenna/radio switch matrix and the PHY/radio switch matrix is configured to:
increase a signal strength of communications received from the device for transmission between the second antenna system and the first PHY.

12. The IHS of claim 7, wherein device communicates with the first antenna system while positioned at a first location, and wherein the device communicates with the second antenna system when relocated to a second location that is different than the first location.

13. The IHS of claim 7, further comprising:
a backplane that includes the antenna/radio switch matrix and the PHY/radio switch matrix, wherein the plurality of antenna systems, the plurality of radio processing engines, and the network processing engine are modular systems that are removably coupled to the backplane.

14. A method for maintaining device/PHY mappings, comprising:
providing a device/PHY mapping between a device and a first PHY when the device communicates with a first antenna system that is connected to the first PHY through connections provided by a PHY/radio switch matrix and an antenna/radio switch matrix to a first radio processing engine;
determining that the device is communicating with a second antenna system that is connected to a second PHY through connections provided by the PHY/radio switch matrix and the antenna/radio switch matrix to a second radio processing engine; and
connecting the second antenna system to the first PHY to maintain the device/PHY mapping between the device and the first PHY, wherein the connecting of the second antenna system to the first PHY includes connecting at least one of the second antenna system and the first PHY to a different radio processing engine using at least one of the PHY/radio switch matrix and the antenna/radio switch matrix.

15. The method of claim 14, wherein the connecting the second antenna system to the first PHY includes using the antenna/radio switch matrix to connect the second antenna system to the first radio processing engine that is connected to the first PHY.

16. The method of claim 14, wherein the connecting the second antenna system to the first PHY includes using the PHY/radio switch matrix to connect the first PHY to the second radio processing engine that is connected to the second antenna system.

17. The method of claim 14, wherein the connecting the second antenna system to the first PHY includes using the antenna/radio switch matrix and the PHY/radio switch matrix to connect each of the second antenna system and the first PHY to a third radio processing engine.

18. The method of claim 14, further comprising:
increasing a signal strength of communications received from the device for transmission between the second antenna system and the first PHY.

19. The method of claim 14, wherein device communicates with the first antenna system while positioned at a first location, and wherein the device communicates with the second antenna system when relocated to a second location that is different than the first location.

20. The method of claim 14, wherein the first antenna system, the second antenna system, the first radio processing engine, the second radio processing engine, and a network processing system that includes the first PHY and the second PHY are each modular systems, and wherein the method further comprises:

coupling each of the first antenna system, the second antenna system, the first radio processing engine, the second radio processing engine, and the network processing system to a backplane that includes the antenna/radio switch matrix and the PHY/radio switch matrix.

\* \* \* \* \*